US009398287B2

(12) United States Patent
Lee

(10) Patent No.: US 9,398,287 B2
(45) Date of Patent: Jul. 19, 2016

(54) CONTEXT-BASED DEPTH SENSOR CONTROL

(71) Applicant: Motorola Mobility LLC, Libertyville, IL (US)

(72) Inventor: Johnny Lee, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 466 days.

(21) Appl. No.: 13/780,592

(22) Filed: Feb. 28, 2013

(65) Prior Publication Data

US 2014/0240464 A1 Aug. 28, 2014

(51) Int. Cl.
 *H04N 13/02* (2006.01)
 *G01S 17/08* (2006.01)
 *G01B 11/25* (2006.01)
 *G01S 17/02* (2006.01)
 *G01S 17/46* (2006.01)
 *G01C 3/08* (2006.01)

(52) U.S. Cl.
 CPC ........ *H04N 13/0253* (2013.01); *G01B 11/2513* (2013.01); *G01B 11/2545* (2013.01); *G01C 3/08* (2013.01); *G01S 17/023* (2013.01); *G01S 17/08* (2013.01); *G01S 17/46* (2013.01)

(58) Field of Classification Search
 CPC ........... G01B 11/2545; G01B 11/2513; H04N 13/0239; H04N 13/0022; G06K 9/0063; G05D 1/0231
 USPC .......................................................... 348/47
 See application file for complete search history.

(56) References Cited

U.S. PATENT DOCUMENTS

| 3,971,065 | A | 7/1976 | Bayer |
| 5,995,883 | A | 11/1999 | Nishikado |
| 6,215,519 | B1 | 4/2001 | Nayar et al. |
| 6,243,537 | B1 * | 6/2001 | Higashino ................ 396/98 |
| 6,906,852 | B1 | 6/2005 | Russell |
| 7,996,097 | B2 | 8/2011 | DiBernardo et al. |
| 8,139,130 | B2 | 3/2012 | Compton |
| 8,295,955 | B2 | 10/2012 | DiBernardo et al. |
| 8,306,362 | B2 | 11/2012 | Compton |
| 8,405,680 | B1 | 3/2013 | Cardoso Lopes et al. |
| 2003/0001956 | A1 * | 1/2003 | Harshbarger et al. ......... 348/189 |
| 2003/0197806 | A1 | 10/2003 | Perry |
| 2004/0105004 | A1 * | 6/2004 | Rui et al. ...................... 348/159 |

(Continued)

OTHER PUBLICATIONS

International Search Report and Written Opinion correlating to PCT/US14/012648 dated Apr. 15, 2014, 9 pages.

(Continued)

*Primary Examiner* — Thai Tran
*Assistant Examiner* — Jose Mesa

(57) ABSTRACT

An electronic device (100) includes a depth sensor (120), a first imaging camera (114, 116), and a controller (802). The depth sensor (120) includes a modulated light projector (119) to project a modulated light pattern (500). The first imaging camera (114, 116) is to capture at least a reflection of the modulated light pattern (500). The controller (802) is to selectively modify (1004) at least one of a frequency, an intensity, and a duration of projections of the modulated light pattern by the modulated light projector responsive to at least one trigger event (1002). The trigger event can include, for example, a change (1092) in ambient light incident on the electronic device, detection (1094) of motion of the electronic device, or a determination (1096) that the electronic device has encountered a previously-unencountered environment.

14 Claims, 10 Drawing Sheets

(56) References Cited

U.S. PATENT DOCUMENTS

| | | | |
|---|---|---|---|
| 2008/0149810 A1* | 6/2008 | Tracy et al. | 250/204 |
| 2009/0160944 A1 | 6/2009 | Trevelyan | |
| 2009/0322745 A1 | 12/2009 | Zhang | |
| 2009/0322891 A1 | 12/2009 | Kondo et al. | |
| 2010/0194963 A1* | 8/2010 | Terashima | 348/333.11 |
| 2010/0265316 A1 | 10/2010 | Sali | |
| 2011/0079714 A1 | 4/2011 | McEldowney | |
| 2011/0187878 A1 | 8/2011 | Mor | |
| 2011/0194121 A1 | 8/2011 | Ertl | |
| 2012/0026085 A1 | 2/2012 | McEldowney | |
| 2012/0147243 A1 | 6/2012 | Townsend | |
| 2012/0194644 A1* | 8/2012 | Newcombe et al. | 348/46 |
| 2012/0228083 A1 | 9/2012 | Terzini | |
| 2012/0262553 A1* | 10/2012 | Chen et al. | 348/47 |
| 2013/0021441 A1 | 1/2013 | Kim | |
| 2013/0155275 A1 | 6/2013 | Shimizu | |
| 2013/0286242 A1 | 10/2013 | Cote | |
| 2014/0062774 A1* | 3/2014 | Hale et al. | 342/357.31 |
| 2014/0240492 A1 | 8/2014 | Lee | |
| 2015/0002734 A1 | 1/2015 | Lee | |

OTHER PUBLICATIONS

Johnny Lee, "Electronic Device with Multiview Image Capture and Depth Sensing", U.S. Appl. No. 13/780,580, filed Feb. 28, 2013, 62 pages.

Arizona State University, "Lunar Reconnaissance Orbiter Camera", www.lroc.asu.edu/EPO/LROC/lroc.php, printed Dec. 5, 2012, 2 pages.

Premier Farnell PLC, "Laser Components—2008364—Laser Diode, 655NM", http://www.newark.com/jsp/search/productdetail.jsp?SKU=24M0531&CMP=KNC-GPLA, printed Dec. 5, 2012, 4 pages.

Wikipedia, "Vertical-Cavity Surface-Emitting Laser", http://en.wikipedia.org/wiki/Vertical-cavity_surface-emitting_laser, printed Dec. 5, 2012, 6 pages.

M. Ghisoni et al., "Single- and Multimode VCSEL's Opeating with Continuous Relief Kinoform for Focussed Spot-Array Generation", IEEE Photonics Tech. Letters, Nov. 1997, vol. 9 No. 11, pp. 1466-1468.

H Martinsson et al., "Monolithic Integration of Vertical-Cavity Surface-Emitting Laser and Diffractive Optical Element for Advanced Beam Shaping", IEEE Photonics Tech. Letters, May 1999, vol. 11 No. 5, pp. 503-505.

George Klein and David Murray, "Parallel Tracking and Mapping for Small AR Workspaces", http://www.youtube.com/watch?v=Y9HMn6bd-v8, Nov. 28, 2007, 3 pages.

Gabe Sibley, "Beginning of the London Dataset", http://www.youtube.com/watch?v=M-WYOMqzicw, Sep. 22, 2010, 2 pages.

SFly Project, "SFly: Swarm of Micro Flying Robots (IROS 2012)", http://www.youtube.com/watch?v=_-p08o_oTO4, May 2, 2012, 3 pages.

Hyon Lim et al., "Real-Time Image-Based 6-DOF Localization in Large-Scale Environments", http://research.microsoft.com/en-us/um/redmond/groups/IVM/ImageBasedLocalization/paper/limCVPR12.pdf, Jun. 2012, 8 pages.

Movidius Ltd., "Movidius MA1133: Bringing HD 3D to Mobile Devices", http://www.movidius.com/assets/Uploads/Movidius-MA1133-Product-Summary2.pdf, 2012, 2 pages.

Barry Green, "Sensor Artifacts and CMOS Rolling Shutter", dvxuser.com/jason/CMOS-CCD/, Accessed Mar. 26, 2013, 8 pages.

Point Grey Research, Inc., "Key Differences Between Rolling Shutter and Frame (Global) Shutter", http://www.ptgrey.com/support/kb/index.asp?a=4&q=115, Jul. 4, 2012, 2 pages.

Lumenera Corporation, "Exposure and Strobe Delay vs. Shutter Type Timing" application note (LA-2014), Feb. 2005, version 1.1, 4 pages.

Andor Technology, "Rolling and Global Shutter" Technical Note, http://www.andor.com/learning-academy/rolling-and-global-shutter-exposure-flexibility, Accessed Apr. 4, 2013, 4 pages.

Non-Final Office Action mailed Sep. 24, 2015 for U.S. Appl. No. 14/086,427, 51 pages.

Non-Final Office Action mailed Jun. 19, 2015 for U.S. Appl. No. 14/186,877, 34 pages.

Final Office Action mailed Dec. 31, 2015 for U.S. Appl. No. 14/186,877, 37 pages.

* cited by examiner

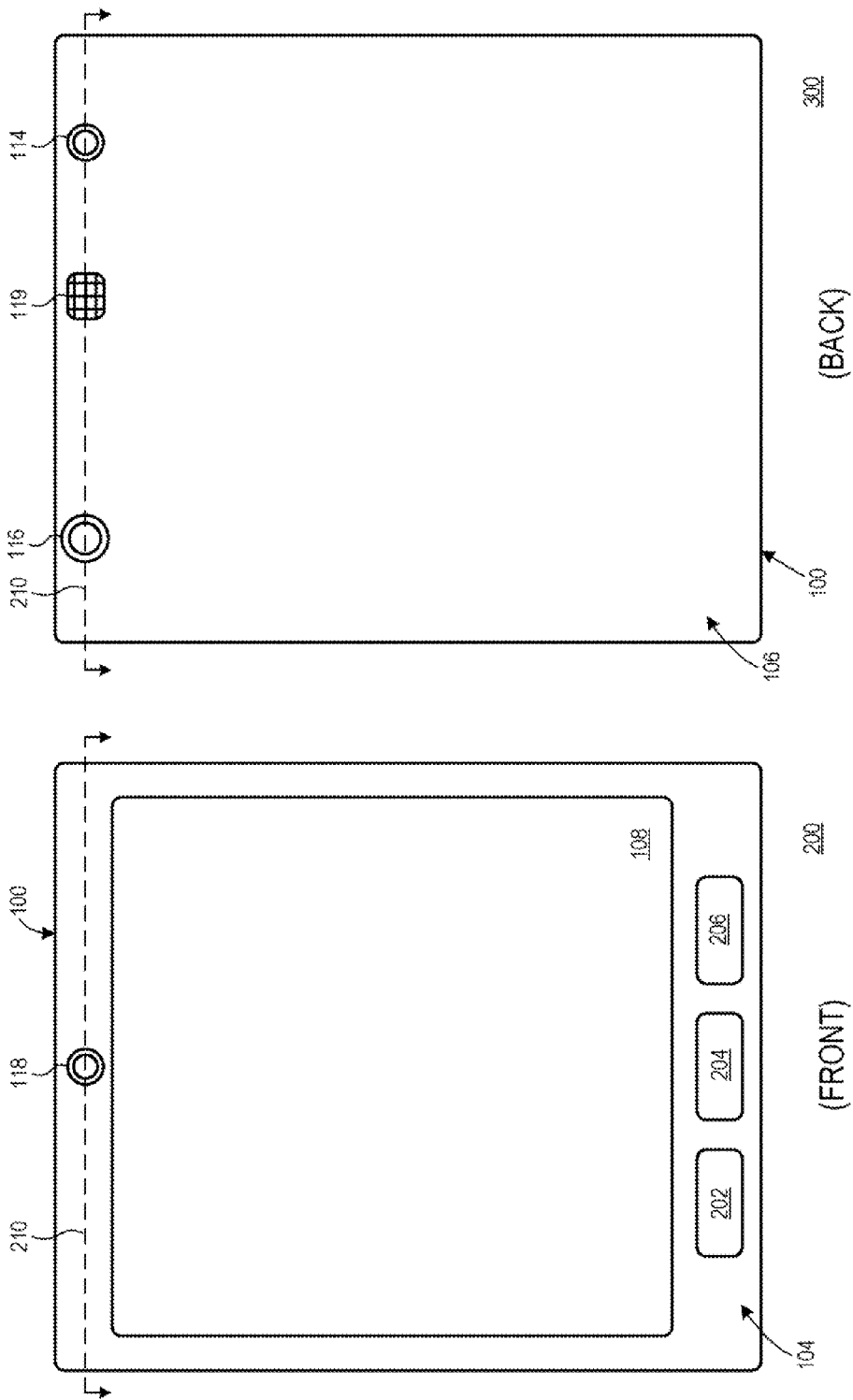

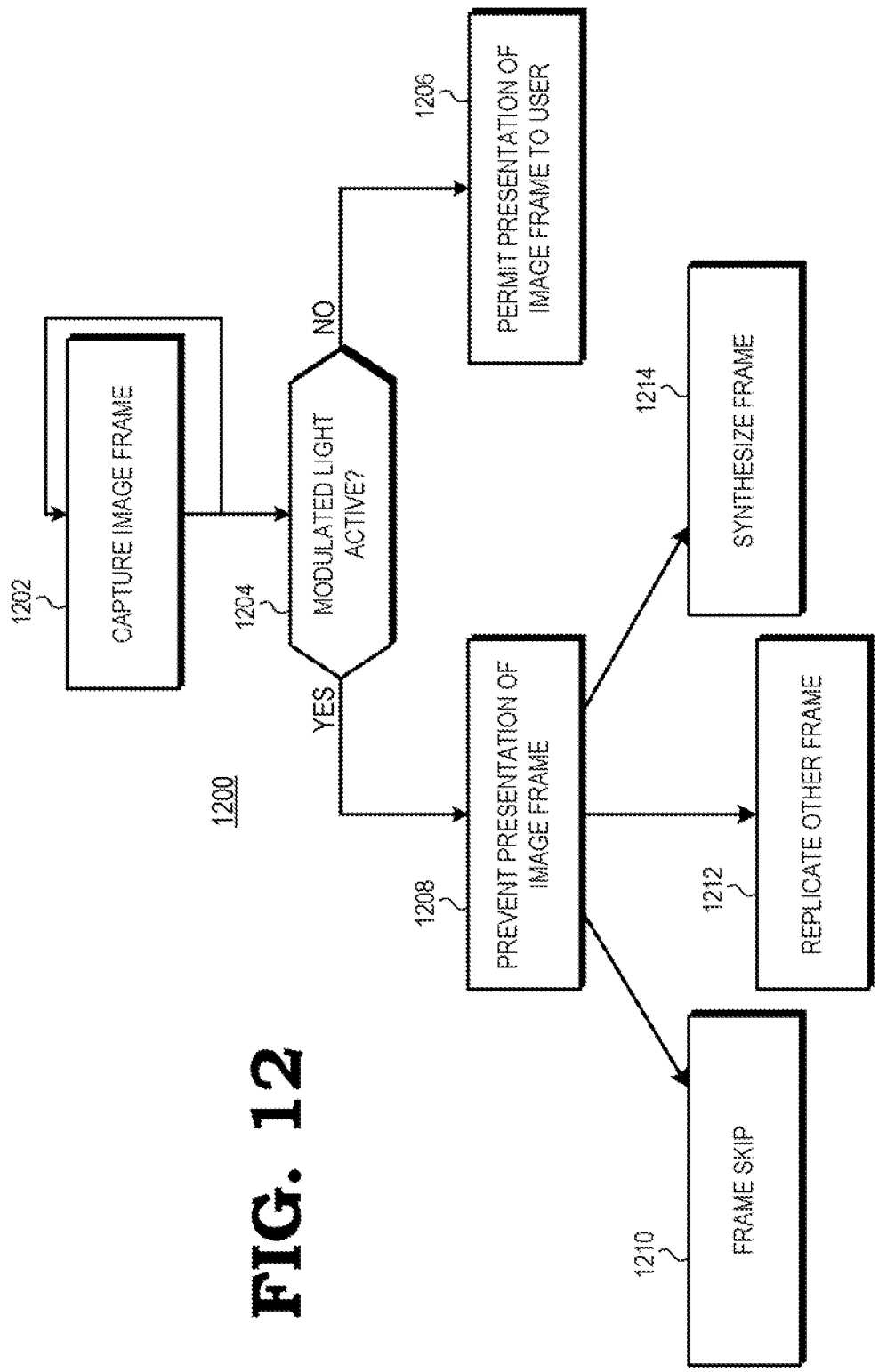

US 9,398,287 B2

CONTEXT-BASED DEPTH SENSOR CONTROL

FIELD OF THE DISCLOSURE

The present disclosure relates generally to depth sensing and more particularly to control of depth sensors for machine vision.

BACKGROUND

Machine vision-enabled devices may employ depth sensors to determine the depth, or relative distance, of objects within a local environment. Typically, these depth sensors rely on the capture of reflections of known spatially-modulated or temporally-modulated light projected at the object by the device. This modulated light often is implemented as infrared (IR) light generated by an IR light source. While effective at enabling depth estimation, the reflected IR light can interfere with visible-light imaging cameras operating in the local environment. Moreover, conventional implementations of the light source for the projected modulated light consume significant power, thereby limiting the implementation of modulated light-based depth sensors in battery-powered devices or in other limited-power implementations.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 2 is a diagram illustrating a front plan view of an electronic device implementing multiple imaging cameras and a depth sensor in accordance with at least one embodiment of the present disclosure.

FIG. 3 is a diagram illustrating a back plan view of the electronic device of FIG. 2 in accordance with at least one embodiment of the present disclosure.

FIG. 12 is a flow diagram illustrating a method for controlling display of visible image frames based on modulated light projection in accordance with at least one embodiment of the present disclosure.

DETAILED DESCRIPTION

Figure 1:
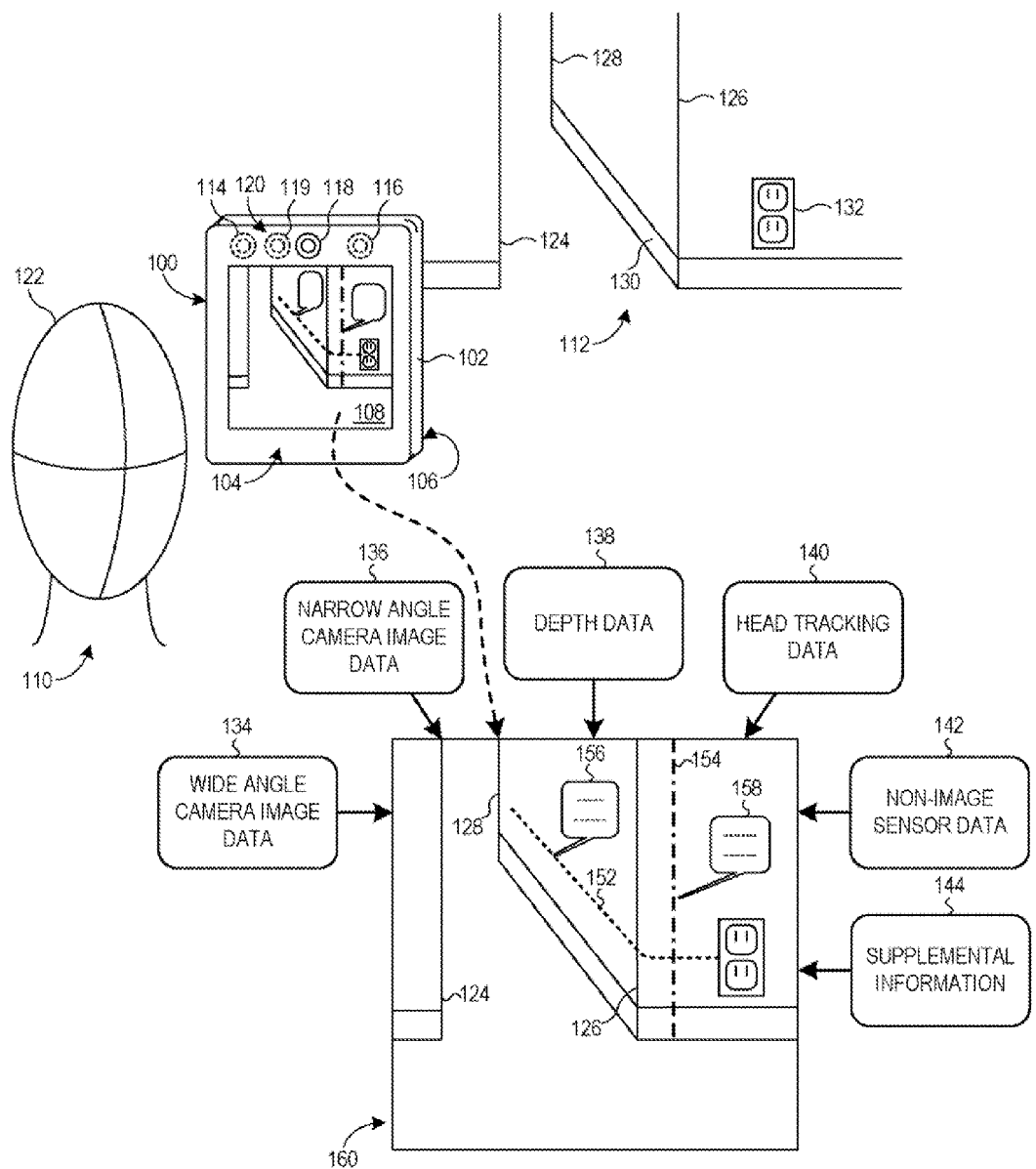
FIG. 1 is a diagram illustrating an electronic device configured to determine a relative position/orientation in a local environment using image sensor data and non-image sensor data in accordance with at least one embodiment of the present disclosure.

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-12 illustrate various techniques for the determination of a relative position or relative orientation of an electronic device within a local environment so as to support location-based functionality, such as augmented reality (AR) functionality, visual odometry or other simultaneous localization and mapping (SLAM) functionality, and the like. The term "position/orientation" is used herein to refer to either or both of position and orientation. In some embodiments, the electronic device includes two or more imaging cameras and a depth sensor disposed at a surface. The two or more imaging cameras may be used to capture multiview imagery of the local environment of the electronic device, and from this information the electronic device may identify spatial features representing objects in the local environment and their distances from the electronic device. Further, the depth sensor may be used to determine the distances of the identified spatial features as either an alternative to, or an augmentation to, the depth calculation provided from analysis of the multiview imagery. The electronic device further may include another imaging camera on a surface facing the user so as to facilitate head tracking or facial recognition or to obtain additional imagery of the local environment.

The identification of the relative position/orientation of objects in the local environment can be used to support various location-based functionality of the electronic device. To illustrate, in some embodiments, the relative positions of objects in the local environment are used, along with non-image sensor data such as orientation readings from a gyroscope, to determine the relative position/orientation of the electronic device in the local environment. The relative position/orientation of the electronic device may be used to facilitate visual odometry, indoor navigation, or other SLAM functionality. Moreover, the relative position/orientation of the electronic device may be used to support augmented reality (AR) functionality, such as the graphical overlay of additional information in the display of imagery captured by the electronic device based on the relative position and orientation of the electronic device, and which also may be based on the position or the orientation of the user's head or eyes relative to the electronic device. In some embodiments, the electronic device determines its position/orientation relative to the local environment, rather than relative to a fixed or defined positioning reference, and thus is not reliant on external positioning information, such as global positioning system (GPS) information, cellular triangulation information, and the like. As such, the electronic device can provide location-based functionality in locations where GPS signaling or cellular signaling is weak or non-existent.

In at least one embodiment, the depth sensor of the electronic device is implemented as a modulated light projector and one or more of the imaging cameras. The modulated light projector projects coded, structured, or otherwise modulated light, typically infrared light, into the local environment, and the one or more imaging cameras capture the reflections of the modulated light from the objects, and from this reflected light the distance of the objects from the electronic device may be determined As the modulated light projector can consume significant power while projecting, the present disclosure describes various techniques for the selective enablement and control of the depth sensor so as to reduce power consumption.

Further described herein is a processing architecture for analyzing image sensor data and non-image sensor data to efficiently identify 2D and 3D spatial features in imagery of the local environment of the electronic device, and for providing location-based functionality using these identified spatial features. In at least one embodiment, the processing architecture utilizes at least two processors, including one processor for identifying 2D spatial features from image data captured by one or more imaging cameras and another processor for identifying 3D spatial features from the identified 2D spatial features. Further, the processor that identifies the 2D spatial features can be configured to identify 2D spatial features as image data is streamed from the imaging cameras and stream the 2D spatial features to the other processor as they are identified, thereby reducing the delay in spatial feature detection that otherwise would result from waiting for the entire image frame to be buffered before commencing spatial feature detection.

FIG. 1 illustrates an electronic device 100 configured to support location-based functionality, such as SLAM or AR, using image and non-image sensor data in accordance with at least one embodiment of the present disclosure. The electronic device 100 can include a portable user device, such as a tablet computer, computing-enabled cellular phone (e.g., a "smartphone"), a notebook computer, a personal digital assistant (PDA), a gaming system remote, a television remote, and the like. In other embodiments, the electronic device 100 can include a fixture device, such as medical imaging equipment, a security imaging camera system, an industrial robot control system, a drone control system, and the like. For ease of illustration, the electronic device 100 is generally described herein in the example context of a portable user device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 104 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 120 disposed at the forward-facing surface 106 and an imaging camera 118 disposed at the user-facing surface 104. In one embodiment, the imaging camera 114 is implemented as a wide-angle imaging camera having a fish-eye lens or other wide-angle lens to provide a wider angle view of the local environment 112 facing the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively. As described in greater detail below, the wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via multiview image analysis. The imaging camera 118 can be used to capture image data for the local environment 112 facing the surface 104. Further, in some embodiments, the imaging camera 118 is configured for tracking the movements of the head 122 or for facial recognition, and thus providing head tracking information that may be used to adjust a view perspective of imagery presented via the display 108.

One or more of the imaging cameras 114, 116, and 118 may serve other imaging functions for the electronic device 100 in addition to supporting position and orientation detection. To illustrate, the narrow-angle imaging camera 116 may be configured or optimized for user-initiated image capture, such as for the capture of consumer-level photographs and video as often found in smartphones and tablet computers, and the imaging camera 118 may be configured or optimized for video conferencing or video telephony as also is often found in smartphones and tablet computers, whereas the wide-angle imaging camera 114 may be primarily configured for machine vision image capture for purposes of location detection. This machine-vision-specific configuration may prioritize light-sensitivity, lens distortion, frame rate, global shutter capabilities, and faster data readout from the image sensor over user-centric camera configurations that focus on, for example, pixel resolution.

The depth sensor 120, in one embodiment, uses a modulated light projector 119 to project modulated light patterns from the forward-facing surface 106 into the local environment, and uses one or both of imaging cameras 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from multiview analysis (e.g., stereoscopic analysis) of the image data captured by the imaging cameras 114 and 116. Alternatively, the depth data from the depth sensor 120 may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-image information for position/orientation detection. This non-image information can be obtained by the electronic device 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like. The non-image sensor information representing a state of the electronic device 100 at a given point in time is referred to as the "current context" of the electronic device for that point in time. This current context can include explicit context, such as the relative rotational orientation of the electronic device 100 or the ambient light from the local environment 112 incident on the electronic device 100. The current context also can include implicit context information, such as information inferred from calendar information or clock information, or information inferred from a user's interactions with the electronic device 100. The user's interactions can include a user's observed past behavior (e.g., a determination of a user's workday commute path and time), recent search queries conducted by the user, a key term search or other analysis of emails, text messages, or other user communications or user-initiated operations, and the like.

In operation, the electronic device 100 uses the image sensor data and the non-image sensor data to determine a relative position/orientation of the electronic device 100, that is, a position/orientation relative to the local environment 112. In at least one embodiment, the determination of the relative position/orientation is based on the detection of spatial features in image data captured by one or more of the imaging cameras 114, 116, and 118 and the determination of the position/orientation of the electronic device 100 relative to the detected spatial features. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging cameras 114 and 116 capture wide angle imaging camera image data 134 and narrow angle imaging camera image data 136, respectively, that includes these spatial features of the hallway. In this example, the depth sensor 120 also captures depth data 138 that reflects the relative distances of these spatial features relative to the current position/orientation of the electronic device 100. Further, the user-facing imaging camera 118 captures image data representing head tracking data 140 for the current position/orientation of the head 122 of the user 110. Non-image sensor data 142, such as readings from a gyroscope, a magnetometer, an ambient light sensor, a keypad, a microphone, and the like, also is collected by the electronic device 100 in its current position/orientation.

From this input data, the electronic device 100 can determine its relative position/orientation without explicit absolute localization information from an external source. To illustrate, the electronic device 100 can perform multiview analysis of the wide angle imaging camera image data 134 and the narrow angle imaging camera image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured image frames of the image data 134 and 136, determine the initial distances to these spatial features, and then track the changes in position and distances of these spatial features in subsequent captured imagery to determine the change in position/orientation of the electronic device 100. In this approach, certain non-image sensor data, such as gyroscopic data or accelerometer data, can be used to correlate spatial features observed in one image frame with spatial features observed in a subsequent image frame.

The relative position/orientation information obtained by the electronic device 100 from the image data captured by the imaging cameras 114, 116, and 118 can be used to support any of a variety of location-based functionality. The relative position/orientation information can be used by the electronic device 100 to support visual odometry or other SLAM functionality. As an example, the electronic device 100 can map the local environment 112 and then use this mapping to facilitate the user's navigation through the local environment 112, such as by displaying to the user a floor plan generated from the mapping information and an indicator of the user's current location relative to the floor plan as determined from the current relative position of the electronic device 100.

Moreover, the relative position/orientation information obtained by the electronic device 100 can be combined with supplemental information 144 to present an augmented reality (AR) view of the local environment 112 to the user 110 via the display 108 of the electronic device 100. This supplemental information 144 can include one or more AR databases locally stored at the electronic device 100 or remotely accessible by the electronic device 100 via a wired or wireless network.

To illustrate, in the depicted example of FIG. 1, a local database stores position/orientation computer-aided drawing (CAD) information for electrical wiring embedded within the walls of the office represented by the local environment 112. Accordingly, the electronic device 100 can capture video imagery of a view of the local environment 112 via the imaging camera 116, determine a relative orientation/position of the electronic device 100 as described above and herein, and determine the position and orientation of electrical wiring located within the walls present in the view of the local environment. The electronic device 100 then can generate a graphical overlay with visual representations of the electrical wiring positioned and oriented relative to corresponding spatial features (e.g., the corners 124, 126, and 128) identified in the video imagery. As illustrated in FIG. 1, the graphical overlay can include colored dashed lines 152 and 154 representing electrical wiring in the current view and description balloons 156 and 158 to provide descriptions of the electrical wiring, such as wiring type, an identifier associated with the wiring, and the building components powered by the corresponding wiring. The electronic device 100 then jointly presents the graphical overlay and the video imagery at the display 108 so as to present the user 110 with a graphical representation 160 of the location of electrical wiring within the current view of the local environment 112 as captured by the narrow angle imaging camera 116. As the electronic device 100 moves relative to the previous view, the electronic device 100 updates the graphical overlay so as to reflect the changed perspective. Moreover, the head tracking data 140 can be used to detect changes in the position of the head 122 of the user 110 relative to the display 108, in response to which the electronic device 100 can adjust the displayed graphical representation 160 so as to reflect the changed viewing angle of the user 110 relative to the display 108.

As another example, a local or remote AR database can be used to facilitate indoor navigation via the electronic device 100. To illustrate, the local environment 112 could represent the interior of a shopping mall and, in response to receiving user input indicating a desire to locate a certain store, the electronic device 100 can access the AR database to determine the location of the store relative to its current location. With this information, the electronic device 100 can display on top of the video imagery currently captured by one or more of the imaging cameras 114, 116, or 118 a graphical overlay that identifies the direction of the store relative to the current direction in which the electronic device 100 is pointed (e.g., via the display of "turn right", "turn left", "proceed straight ahead", or "turn around" arrow graphics).

Another example application of the relative position/orientation determination process can include, for example, missing/new object detection whereby the appearance of a new object or the disappearance of a previously identified object can be determined based on a comparison of the expected local environment view of the electronic device 100 for a given relative position and orientation to the actual local environment view captured by the electronic device 100 in the same position/orientation. As described below, the geometric uncertainty introduced by differences between an expected environment and the actual encountered environment can trigger various operations, including a refresh operation whereby the electronic device 100 initiates a remapping of the portion of the local environment 112 exhibiting the change.

FIGS. 2 and 3 illustrate example front and back plan views of an example implementation of the electronic device 100 in a tablet form factor in accordance with at least one embodiment of the present disclosure. The electronic device 100 may be implemented in other form factors, such as a smart phone form factor, a medical imaging device form factor, and the like, which implement configurations analogous to those illustrated.

As illustrated by the front plan view 200 of FIG. 2, the electronic device 100 can include the display 108, the imaging camera 118, and one or more user interface components, such as touch keys 202, 204, and 206 of a keypad disposed at the user-facing surface 104. Moreover, the display 108 may be implemented as a touch screen display so as to facilitate user input and control via the user's interaction with the display 108.

As illustrated by the back plan view 300 of FIG. 3, the electronic device 100 can include the wide-view imaging camera 114, the narrow-view imaging camera 116, and the modulated light projector 119 disposed at the forward-facing surface 106. Although FIGS. 2 and 3 illustrate the imaging cameras 114, 116, and 118 and the modulated light projector 119 aligned along a straight line for the benefit of an example cross-section view in FIG. 4, the imaging cameras 114, 116, and 118 and the modulated light projector 119 may be offset relative to each other. For example, the modulated light projector 119 may be positioned at an offset from a line extending between the imaging cameras 114 and 116, or the modulated light projector 119 and the wide-angle imaging camera 114 may be disposed along a line parallel to the top edge of the electronic device 100 and the narrow-angle imaging camera 116 may be disposed at a location offset from this line. Moreover, although the modulated light projector 119 is illustrated as positioned between the imaging cameras 114 and 116, in other implementations the modulated light projector 119 may be positioned to the outside of one of the imaging cameras 114 and 116.

Figure 4:
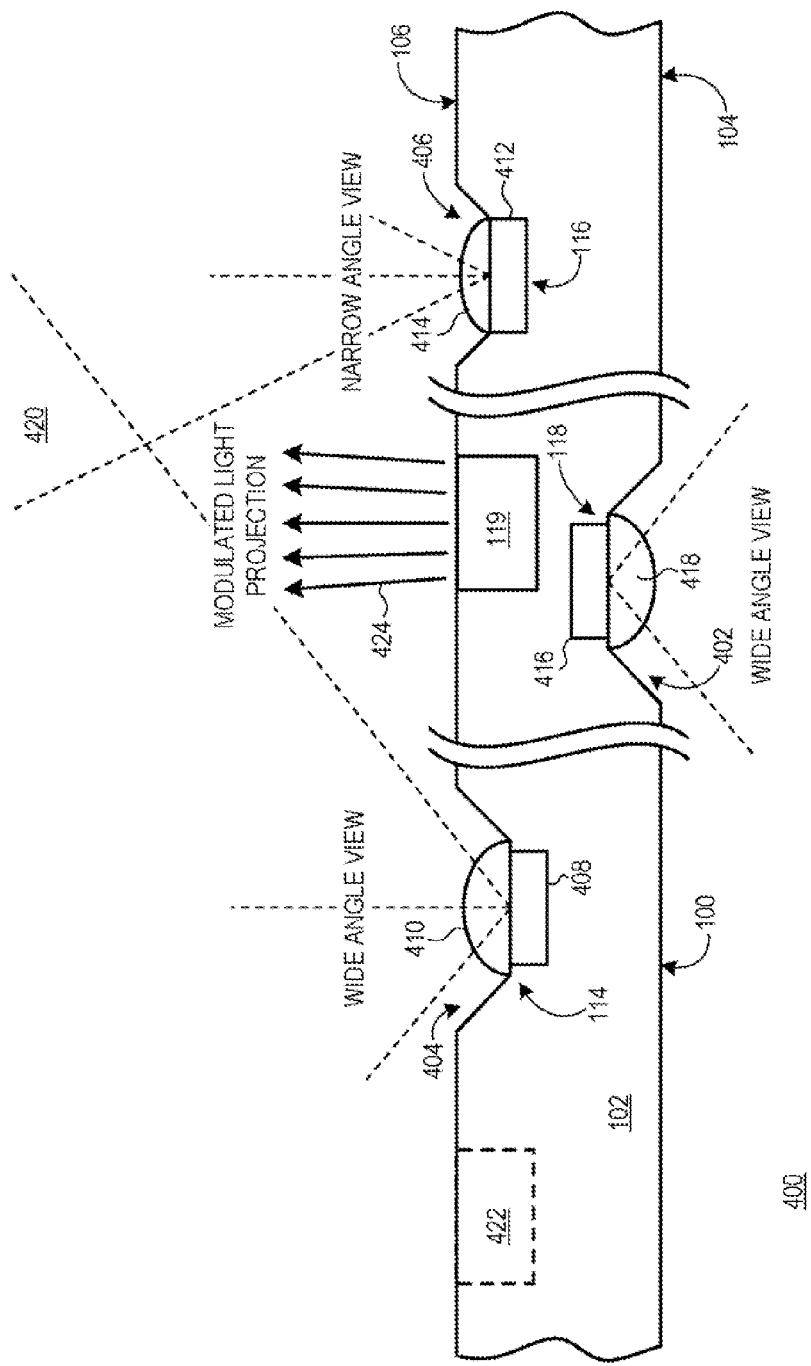
FIG. 4 is a diagram illustrating a cross-section view of the electronic device of FIG. 2 in accordance with at least one embodiment of the present disclosure.

FIG. 4 illustrates an example cross-section view 400 of the electronic device 100 along a line 210 depicted in the plan views of FIGS. 2 and 3 in accordance with at least one embodiment of the present disclosure. As illustrated, the electronic device 100 includes the user-facing imaging camera 118 disposed in an aperture 402 or other opening in the housing 102 at the user-facing surface 104 and includes the wide-angle imaging camera 114 and the narrow-angle imaging camera 116 disposed in apertures 404 and 406, respectively, or other openings in the housing 102 at the forward-facing surface 106. The wide-angle imaging camera 114 includes an image sensor 408 and one or more lenses 410 disposed over a sensing surface of the image sensor 408. The narrow-angle imaging camera 116 includes an image sensor 412 and one or more lenses 414 disposed over the sensing surface of the image sensor 412. Similarly, the user-facing imaging camera 118 includes an image sensor 416 and one or more lenses 418 disposed over the sensing surface of the image sensor 416.

The type of lens implemented for each imaging camera depends on the intended function of the imaging camera. Because the forward-facing imaging camera 114, in one embodiment, is intended for machine vision-specific imagery for analyzing the local environment 112, the lens 410 may be implemented as a wide-angle lens or a fish-eye lens having, for example, an angle of view between 160-180 degrees with a known high distortion. The forward-facing imaging camera 116, in one embodiment, supports user-initiated image capture, and thus the lens 414 of the forward-facing imaging camera 116 may be implemented as a narrow-angle lens having, for example, an angle of view between 80-90 degrees horizontally. Note that these angles of view are exemplary only. The user-facing imaging camera 118 likewise may have other uses in addition to supporting local environment imaging or head tracking. For example, the user-facing imaging camera 118 also may be used to support video conferencing functionality for the electronic device 100. Accordingly, depending on the application the lens 418 of the user-facing imaging camera 118 can be implemented as a narrow-angle lens, a wide-angle lens, or a fish-eye lens.

The image sensors 408, 412, and 416 of the imaging cameras 114, 116, and 118, respectively, can be implemented as charge coupled device (CCD)-based sensors, complementary metal-oxide-semiconductor (CMOS) active pixel sensors, and the like. In a CMOS-based implementation, the image sensor may include a rolling shutter sensor whereby a group of one or more rows of pixel sensors of the image sensor is read out while all other rows on the sensor continue to be exposed. This approach has the benefit of providing increased sensitivity due to the longer exposure times or more usable light sensitive area, but with the drawback of being subject to distortion due to high-speed objects being captured in the frame. The effect of distortion can be minimized by implementing a global reset mechanism in the rolling shutter so that all of the pixels on the sensor begin collecting charge simultaneously, rather than on a row-by-row basis. In a CCD-based implementation, the image sensor can be implemented as a global shutter sensor whereby all pixels of the sensor are exposed at the same time and then transferred to a shielded area that can then be read out while the next image frame is being exposed. This approach has the benefit of being less susceptible to distortion, with the downside of generally decreased sensitivity due to the additional electronics required per pixel.

In some embodiments the fields of view of the wide-angle imaging camera 114 and the narrow-angle imaging camera 116 overlap in a region 420 so that objects in the local environment 112 (FIG. 1) in the region 420 are represented both in the image frame captured by the wide-angle imaging camera 114 and in the image frame concurrently captured by the narrow-angle imaging camera 116, thereby allowing the depth of the objects in the region 420 to be determined by the electronic device 100 through a multiview analysis of the two concurrent image frames. As such, the forward-facing imaging cameras 114 and 116 are positioned at the forward-facing surface 106 so that the region 420 covers an intended distance range and sweep relative to the electronic device 100. Moreover, as the multiview analysis relies on the parallax phenomena, the forward-facing imaging cameras 114 and 116 are sufficiently separated to provide adequate parallax for the multiview analysis.

Also illustrated in the cross-section view 400 are various example positions of the modulated light projector 119. The modulated light projector 119 projects an infrared modulated light pattern 424 in a direction generally perpendicular to the surface 106, and one or both of the forward-facing imaging cameras 114 and 116 are utilized to capture reflection of the projected light pattern 424. In the depicted example, the modulated light projector 119 is disposed at the forward-facing surface 106 at a location between the imaging cameras 114 and 116. In other embodiments, the modulated light projector 119 can be disposed at a location between one of the imaging cameras and an edge of the housing 102, such as at a location 422 between the wide-angle imaging camera 114 and the side of the housing 102, or at a location (not shown) between the narrow-angle imaging camera 116 and the side of the housing 102.

Figure 6:
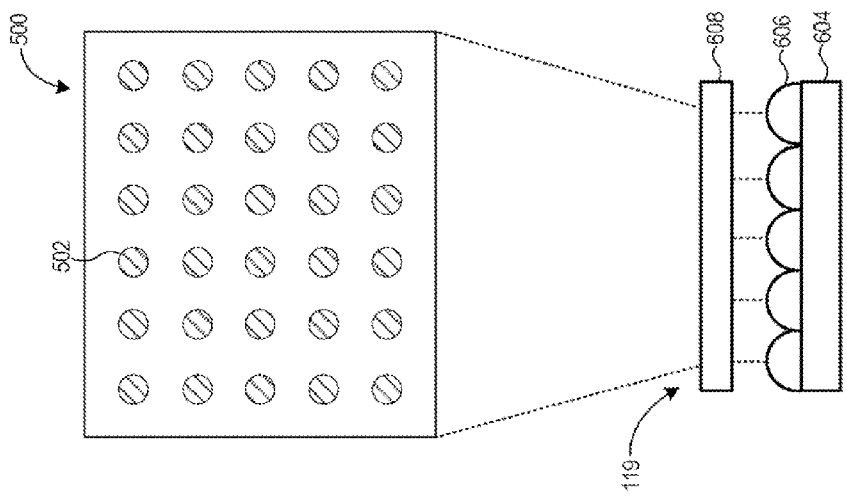
FIG. 6 is a diagram illustrating a cross-section view of a vertical-cavity surface-emitting laser (VCSEL) diode-based modulated light projector in accordance with at least one embodiment of the present disclosure.
Figure 5:
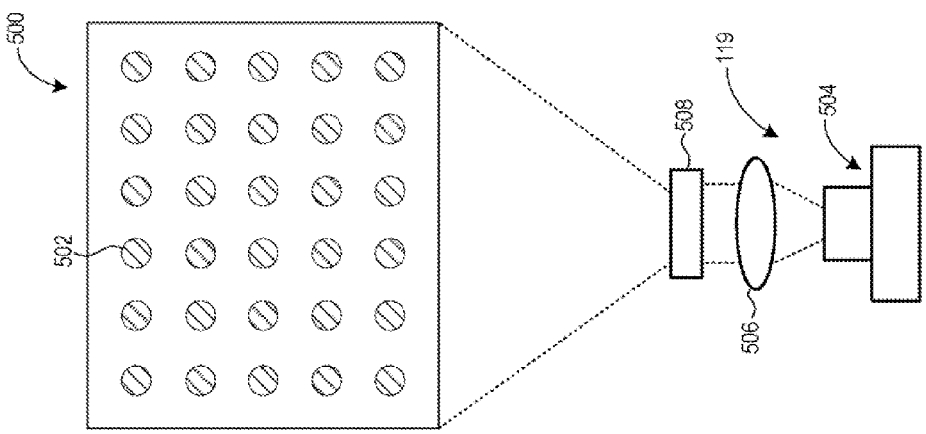
FIG. 5 is a diagram illustrating a cross-section view of a collimating lens-based modulated light projector in accordance with at least one embodiment of the present disclosure.

FIGS. 5 and 6 illustrate example implementations of the modulated light projector 119 in accordance with various embodiments of the present disclosure. In both instances, the modulated light projector 119 operates to project a modulated light pattern 500 composed of infrared light or, in some instances, visible light having a specified color or set of colors, or a specified frequency. In some embodiments, the modulated light pattern 500 comprises a spatially-modulated light pattern, such as the projection of a DeBruijn sequence, an M-array of light features (such as the illustrated matrix of dots 502, whereby the dots 502 are areas of high light intensity), and the like. Other spatially-modulated light patterns that may be implemented include, for example, concentric ring patterns or concentric rectangular patterns, parallel lines, or parallel and perpendicular lines (i.e., a grid), and the like. In other embodiments, the modulated light pattern 500 comprises a temporally-modulated (time-multiplexed) light pattern sequence, such as a binary code pattern sequence, an n-ary code pattern sequence, and the like. In temporally-modulated light applications, the depth sensor 120 determines the depth data through an analysis of a corresponding sequence of reflected light patterns, rather than through any reflected pattern individually.

The projection of the modulated light pattern 500 into the local environment of the electronic device 100 results in the reflection of light from objects in the local environment. Because the depth, or distance, of a surface of an object from the modulated light projector 119 impacts the reflection of the projected light incident on the surface, the electronic device 100 can use the pattern distortion present in the reflection of the modulated light pattern 500 to determine the depth of the object surface using any of a variety of well-known modulated light depth estimation techniques. Alternatively, both of the forward-facing imaging cameras 114 and 116 can be used to capture the reflection of the projected modulated light pattern 500 and multiview image analysis can be performed on the parallel captured depth imagery to determine the depths of objects in the local environment. In other embodiments, the electronic device 100 can use one or both of the forward-facing imaging cameras 114 and 116 as time-of-flight imaging cameras synchronized to the projection of the modulated light pattern 500, whereby the electronic device 100 calculates the depths of objects in the captured reflections using any of a variety of well-known time-of-flight depth algorithms. As yet another example, the electronic device 100 can employ a high-speed exposure shutter imaging camera (either as one of the forward-facing imaging cameras 114 and 116 or as a separate forward-facing imaging camera) that captures reflected light from a pulse of infrared light or near-infrared light from the modulated light projector 119, whereby the amount of reflected pulse signal collected for each pixel of the sensor corresponds to where within the depth range the pulse was reflected from, and can thus be used to calculate the distance to a corresponding point on the subject object. The ZCam™ imaging camera available from 3DV Systems, Inc. is an example of a commercial implementation of this type of imaging-based depth sensor.

In the example of FIG. 5, the modulated light projector 119 is implemented as an edge-emitting laser diode 504 that emits divergent IR laser light toward a collimating lens 506, which collimates the divergent laser light and directs the collimated laser light to a diffractive optical element (DOE) 508 (also frequently referred to as a "kinoform"), which generates the modulated light pattern 500 from the collimated laser light. The DOE 508, in one embodiment, can function in effect as a beam splitter to generate a pattern, such as an array of dots 502 illustrated in FIG. 5.

In the example of FIG. 6, the modulated light projector 119 is implemented using an array of one or more vertical-cavity surface-emitting laser (VCSEL) diodes 604 that emits divergent laser light. An array 606 of micro-lenses is disposed at the emitting surface of the one or more VCSEL diodes 604 for collimating and focusing the laser light from the VCSEL diode 604. A DOE 608 is disposed over the array 606 of micro-lenses to project the resulting collimated laser light as the modulated light pattern 500. The example implementation of FIG. 6 has the benefit of generally being thinner and having lower power consumption compared to edge-emitting laser diode implementations of comparable output. In some embodiments, the modulated light projector 119 further may include a focusing lens (not shown) disposed over the DOE 608.

Figure 7:
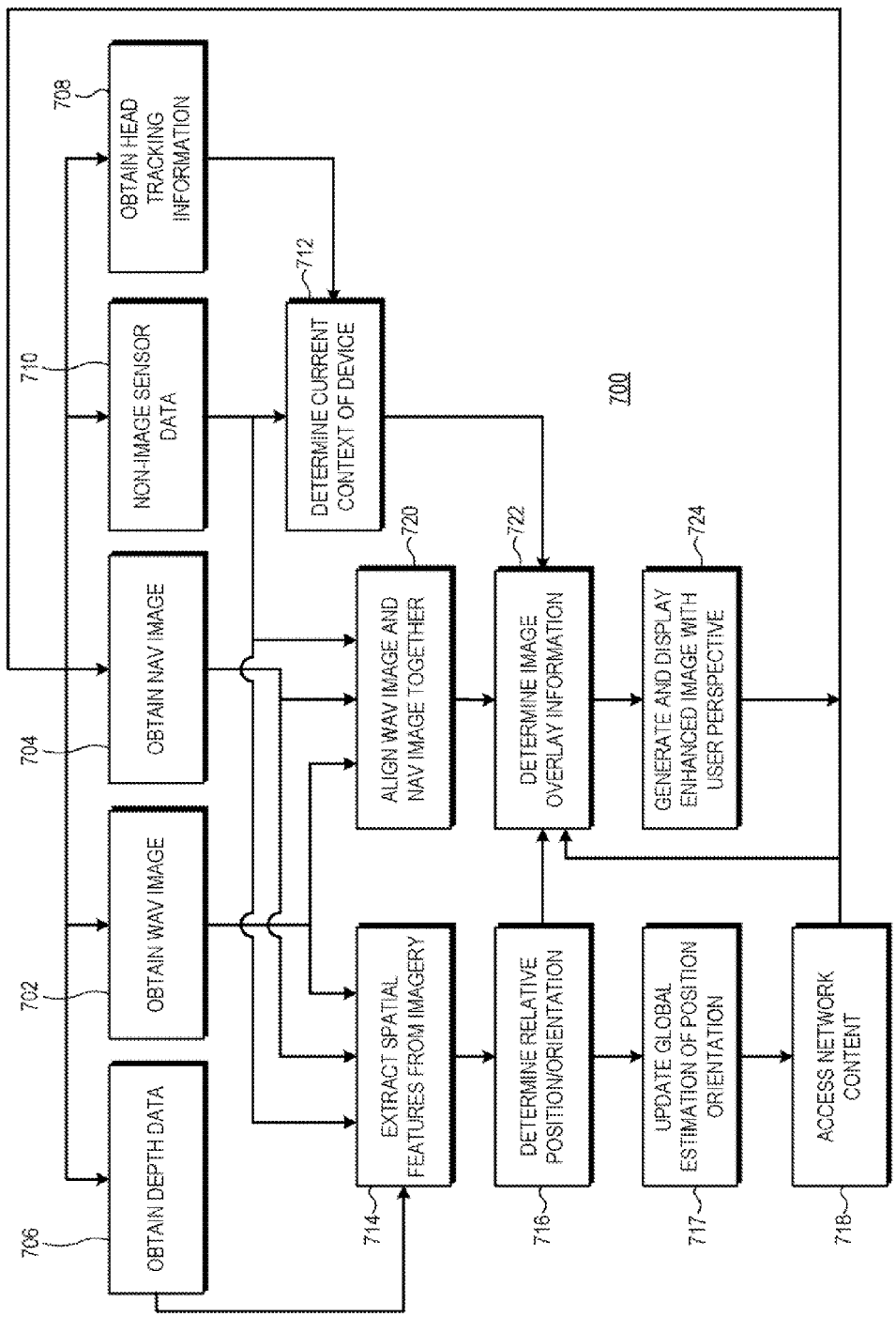
FIG. 7 is a flow diagram illustrating an operation of an electronic device to determine a relative position/orientation of the electronic device in a local environment based on image sensor data and non-image sensor data in accordance with at least one embodiment of the present disclosure.

FIG. 7 illustrates an example method 700 of operation of the electronic device 100 for providing location-based functionality in accordance with at least one embodiment of the present disclosure. For ease of illustration, the method 700 is depicted and generally described as a single loop of operations that can cycle repeatedly. However, not all operations must cycle at the same rate, as described in detail below. It is understood that the steps of the depicted flowchart of FIG. 7 can be performed in any order, and certain ones can be eliminated, and/or certain other ones can be added or repeated depending upon the implementation.

An iteration of method 700 initiates with the capture of various image sensor data and non-image sensor data. In one embodiment, the capture of the sensor data is triggered by, or otherwise synchronized to, the capture of concurrent image frames by one or more of the imaging cameras 114, 116, and 118 (FIG. 1) of the electronic device 100. In other embodiments, various sensor data may be periodically or otherwise repeatedly obtained and then synchronized to captured image data using timestamps or other synchronization metadata. This capture of sensor data can include the capture of wide angle view (WAV) image data for the local environment 112 (FIG. 1) via the wide-angle imaging camera 114 (FIG. 1) at block 702 and the capture of narrow angle view (NAV) image data for the local environment 112 via the narrow-angle imaging camera 116 at block 704. Further, in the event that the depth sensor 120 is activated, depth data for the local environment can be captured via the depth sensor 120 at block 706. Furthermore, head tracking data representing the current position of the user's head 122 can be obtained from the user-facing imaging camera 118 at block 708.

At block 710, the electronic device 100 captures sensor data from one or more non-image sensors. To this end, the electronic device 100 can implement any of a variety of non-image sensors to facilitate the determination of the relative position/orientation of the electronic device 100. Such non-image sensors can include one or more of a gyroscope, an accelerometer, a magnetometer, an altimeter, and a gravity gradiometer that provide explicit information pertaining to the relative position, orientation, or velocity of the electronic device 100. The non-image sensors also can include sensors to provide context for the local environment 112, such as ambient light sensors to sense the degree of ambient light incident on the electronic device and temperature gauges to sense the current temperature of the local environment. Further, the non-image sensor data obtained by the electronic device 100 can include implicit context information, such as keywords, search terms, or location indicia discerned from a user's manipulation of a keyboard or touchscreen of the electronic device 100 or discerned from the user's speech as captured by a microphone of the electronic device 100. The user's usage history likewise can serve as implicit context information.

It should be noted that different sensors may be read at different rates or frequencies. For example, an ambient light reading may be taken only once for every N image frame captures by the imaging cameras 114, 116, and 118, whereas a six-degrees-of-freedom (6DoF) reading from the gyroscope may be taken every image frame capture so as to enable detection of the relative orientation of the electronic device 100 when the corresponding image frame was captured. Still further, accelerometer readings may be obtained at a rate much higher than the image frame capture rate so as to facilitate a more accurate internal navigation determination by the electronic device 100.

At block 712, the electronic device 100 uses the captured non-image sensor data to determine a current context of the electronic device 100. The current context collectively represents non-position state information for the electronic device 100 that may facilitate the determination of the relative position of the electronic device 100 or that may facilitate the presentation of augmented information based on the determined relative position of the electronic device. This state information can include explicit state information, such as state information gleaned from various non-image sensors. Examples of explicit state information that may be represented in current context can include: the current 6DoF orientation of the electronic device 100; the current relative velocity of the electronic device 100; the current ambient light incident on the electronic device 100; the current time, day of week, or calendar date; the availability or signal strength of various wireless signaling (e.g., signaling from a cellular base station or wireless local area network access point); and the like. The state information represented in the current context also can include implicit state information; that is, information implied from other information available to the electronic device 100. Examples of implicit state information can include: a keyword search or key term analysis of recent text input by the user via a keyboard or touchscreen; recent web searches performed by the user via the electronic device 100; a history of the user's location-related habits (e.g., an history of the user's commutes to and from work); hints at the user's intended destination from an analysis of e-mail or other records stored at the electronic device 100 or at a remote location; and the like.

At block 714 the electronic device 100 analyzes the captured image sensor data and depth data to identify spatial features of the local environment 112 that are represented in the captured imagery. Spatial features that may be so identified can include simple structures in the captured imagery, such as edges and corners or other interest points, or may include more complex structures, such as curves, planes, blobs, or entire objects. The electronic device 100 can utilize any of a variety of well-known digital image processing techniques to extract spatial features from the captured image frames, such as the Canny edge detector or the Sobel operator to detect edges, the FAST corner detector or the Harris and Stephens corner detector to detect corners, or the Laplacian of Gaussian (LoG) or the Difference of Gaussian (DoG) detectors to detect corners or blob objects.

The electronic device 100 can perform the spatial feature detection process for one or more of the wide angle view (WAV) image frame captured by the wide-angle imaging camera 114, the narrow angle view (NAV) image frame captured by the narrow-angle imaging camera, the image frame captured by the user-facing imaging camera 118, as well as the reflected modulated light image frame captured by the depth sensor 120 (which may include an image frame captured by one of the forward-facing imaging cameras 114 and 116).

The identification of the spatial features in an image provides the relative location of those spatial features in a two-dimensional space, that is, "2D spatial features." In order to map a 2D spatial feature to a third dimension (i.e., the distance, or "depth" from the electronic device 100), that is, to determine the corresponding "3D image feature", the electronic device 100 determines the depth of the 2D feature relative to the electronic device 100 using one or both of multiview image analysis or analysis using the depth sensor data.

For multiview image analysis, the electronic device 100 relies on the parallax phenomenon by matching spatial features identified in the WAV image frame to spatial features identified in the corresponding NAV image frame using any of a variety of feature matching techniques, and then calculating the relative depth of each spatial feature based on the shift in position of the spatial feature between the two image frames and based on the distance between the optical axis of the wide-angle imaging camera 114 and the optical axis of the narrow-angle imaging camera 116. For identifying the depth of a 2D feature using the depth sensor data, the electronic device 100 matches spatial features identified in at least one of the visible-light image frames (that is, one of the NAV image frame or the WAV image frame) to spatial features identified in the depth sensor data, and the electronic device 100 can determine an identified visible-light spatial feature as having the depth-distance indicated by a matching spatial feature from the depth sensor data. Rather than, or in addition to, using the WAV image frame or NAV image frame, in some embodiments the electronic device 100 can use an aligned (or "stitched") image frame generated from the alignment and combination (or "stitching") of the WAV image frame and the NAV image frame, as described below with reference to block 720.

With the 3D spatial features identified in the current captured imagery of the local environment 112, at block 716 the electronic device 100 determines or updates its current relative position/orientation based on an analysis of the 3D spatial features. In one embodiment, the electronic device 100 implements a visual odometry-based position/orientation detection process whereby the electronic device 100 determines its new position/orientation relative to its previously determined position/orientation based on the shifts in positions of the same spatial features between current captured imagery and previously-captured imagery in a process commonly referred to as "optical flow estimation," Example algorithms for optical flow estimation includes the well-known Lucas-Kanade method, as well as template-based approaches or feature descriptor matching-based approaches.

In some embodiments, the electronic device 100 utilizes the current context determined at block 712 to aid the determination of the current position/orientation. In some implementations, the current context is used to verify or refine a position/orientation reading originally determined through imagery analysis. To illustrate, the electronic device 100 may determine an orientation reading from the imagery analysis and then use the most recent 6DoF reading from a gyroscope sensor to verify the accuracy of the image-based orientation reading. As another example, the electronic device 100 may determine a current position from imagery analysis, determine the average velocity the electronic device 100 would have needed to travel at to transition from the previously determined position to the current position, and then verify that this estimated velocity with one or more readings from an accelerometer so as to verify that the estimated current position is consistent with the measured velocity readings. In some embodiments, the electronic device 100 utilizes the current context determined at block 712 to filter the image data to be utilized in performing the imagery analysis for position/orientation detection. As one example, the electronic device 100 may use a 6DoF reading from a gyroscope or a gravitational orientation reading from a gravity gradiometer to determine the current gravitational orientation of the electronic device 100 and use this information to avoid spatial feature correlation efforts for potential spatial feature matches that would not be possible given the gravitational orientation of the electronic device 100.

Further, the electronic device 100 may use user-provided location context to more precisely identify the general location or area of the electronic device 100. As an example, the electronic device 100 may detect a reference to a particular shopping mall in the user's recent email, audio, or text messaging communications, and thus postulate that the user is located at the shopping mall. From this, the electronic device 100 can, for example, access a database having location/mapping information for the shopping mall and focus the imagery-based localization based on this location/mapping information.

Mobile robots often implement simultaneous localization and mapping (SLAM) algorithms to both map a local environment and determine their relative location within the mapped environment without a priori knowledge of the local environment. The electronic device 100 can utilize these same SLAM techniques using multiple iterations of the position/orientation determination process of block 716 over time so as to generate a map of the local environment 112 while concurrently determining and updating the position/orientation of the electronic device 100 at each appropriate point in time. This local mapping information can be utilized by the electronic device 100 to support any of a variety of location-based functionality, such as use in determining a path for a user to a specified destination and providing visual navigational aids to the user according to this path, as described in greater detail below.

In some embodiments, the electronic device 100 may maintain estimates of the global, or absolute, position/orientation of spatial features identified in the local environment 112. To this end, the electronic device 100 may, at block 717, update global location estimations of spatial features identified at block 714 using non-image sensor data representative of global position/orientation information, such as sensor data captured at block 710 from a GPS receiver, a magnetometer, gyrocompass, and the like. This global position/orientation information may be used to determine the global position/orientation of the electronic device 100, and from this information, the electronic device 100 can estimate the global position/orientations of identified spatial features based on their positions/orientations relative to the electronic device 100. The electronic device 100 then may store or update this estimated global position/orientation for a spatial feature as metadata associated with the spatial feature.

Moreover, the electronic device 100 can use these estimates of the global positions/orientations of spatial features to selectively forgo the process of obtaining updates to certain non-image sensor data at an iteration of block 710. For example, if the electronic device 100 identifies a repeating spatial feature (that is a spatial feature also identified from a previous iteration of block 714), the electronic device 100 can use the estimate of the global position/orientation of this repeated spatial feature in place of certain other non-image sensor data, such as GPS data from a GPS receiver. In a similar approach, the electronic device 100 also can use the estimated global positions/orientations previously determined for one or more spatial features to assign estimated global positions/orientations to newly-encountered spatial features based on their estimated positions/orientations relative to the previously-mapped spatial features.

With the determination of the current position/orientation of the electronic device 100 and various spatial features identified from the image data captured at the current position/orientation, at block 718 the electronic device 100 can access network content based on the current position/orientation so as to support certain location-based functionality of the electronic device 100 or to support certain location-based functionality of a networked system in communication with the electronic device 100. As an example, the electronic device 100 may support a networked multi-player video game that provides a virtual reality based on the local area of the electronic device 100. With the current position/orientation, the electronic device 100 can access player state information so as to display the positions of other players relative to the current position of the electronic device 100. As another example, the electronic device 100 may support a friend-mapping application that maps the locations of friends, colleagues, and other persons of interest to the user. The electronic device 100 can provide its current position to a centralized server, which both updates other users' accounts to reflect the current position and updates the electronic device 100 with other users that are within a specified distance of the current location.

In addition to, or instead of, downloading network content, the electronic device 100 may upload device content to a network at block 718. The uploaded device content may include, for example, image data, information pertaining to identified spatial features and their corresponding metadata, relative position/orientation information, estimated absolute position/orientation information, and the like. This uploaded device content may be assimilated into a database of such information from a multitude of similar devices, and this database then may be used to provide various location-based services. For example, content data from the electronic device 100 may be integrated with similar content to provide imagery, location, and routing information for network-connected navigation/mapping software applications.

As noted above, the electronic device 100 can include a display 108 (FIG. 1) to display imagery of the local environment 112 captured using one or both of the forward-facing imaging cameras 114 and 116. The displayed imagery also can include augmented reality graphical information, such as the example described above with reference to FIG. 1 whereby the positions of electrical wiring in the walls of an office are noted in a graphical overlay synchronized to the displayed imagery of the walls. To this end, at block 720 the electronic device 100 performs an image alignment process to combine one or more WAV images and one or more NAV images captured at one or more iterations of blocks 702 and 704 to form a single combined image frame. The image alignment process can add detail from a NAV image to a WAV image to provide a more detailed version of the WAV image, or vice versa. Alternatively, multiple NAV images can be aligned and combined to form a single image frame that depicts a larger area (e.g., a panorama) than any single individual NAV image. In other embodiments, the electronic device 100 can instead elect to present either the WAV image or the NAV image without modification.

At block 722, the electronic device 100 determines the AR information to be graphically presented to the user as a graphical overlay for the image frame generated or selected at block 720 and provides the image frame and the graphical overlay for display at the electronic device 100 at block 724. The AR information can be locally stored at the electronic device 100, such as in a hard drive or a removable media storage device. As discussed above with reference to block 718, the AR information may be remotely stored, such as at an Internet-connected server accessed by the electronic device 100 via a WLAN or cellular data connection, and AR information may be accessed in response to the determination of the current position/orientation. The particular AR information presented to the user in conjunction with the image frame can be selected based on explicit user information, such as by the user selecting the virtual display of the positions of heating, ventilation, and air conditioning (HVAC) ducts within the walls, floors, and ceilings of the local environment 112. The AR information selected for presentation also can be selected based on implicit selection criteria. For example, in response to detecting that the user is traveling toward a specified destination identified in the user's text message communications, the electronic device 100 can generate AR information that presents various metrics pertaining to the user's progress toward the destination, such as the estimated time needed to reach the destination from the user's current position, the compass direction of the destination relative to the user's current position, and the like.

The view perspective of the AR information presented in the graphical overlay often may be dependent on the particular position/orientation of the electronic device 100 as determined at block 716. For example, a user may interface with a GUI of the electronic device 100 to direct the electronic device 100 to aid the user in finding an exit door. Assuming the electronic device 100 has mapped the local environment 112 though a SLAM process at block 716 and has identified the exit door through this mapping, the electronic device 100 can use the current position of the electronic device 100 relative to this mapping to determine a route through the local environment to the exit door and then use the orientation of the electronic device 100 to direct navigational arrow graphics that navigate the user to the exit door. As the user (and the electronic device 100) moves along the path to the exit door, the electronic device 100 can update the navigational arrow graphic presented to reflect any changes in direction necessary to continue navigating the path to the exit door. In a more sophisticated application, electrical wiring and HVAC duct location information for the office may be stored in a computer-aided drawing (CAD) form such that the electronic device 100 can present the graphical representations of the electrical wiring and HVAC duct locations present in the presented image frame of the area of the office facing the rear of the electronic device 100 in a three-dimensional form that correlates to the relative positions/orientations of the corresponding walls, floors, and ceilings present in the presented image. As the user moves the electronic device 100 around the office, the presented image of the local environment 112 changes and thus the electronic device 100 updates the electrical wiring and HVAC duct overlay to reflect the changes in the area of the office presented as imagery at the display 108.

The view perspective presented by the graphical overlay also may be modified based on changes in the position of the user's head (or the user's eyes) relative to the display 108. To this end, the electronic device 100 can react to head/eye position changes as represented in the head tracking or eye tracking information captured at block 708 to change the view perspective of the image and graphical overlay presented at the display 108.

As noted above, the electronic device 100 cycles through iterations of the method 700 to provide real-time, updated localization, mapping, and augmented reality display. However, these sub-processes do not necessarily cycle at the same rate. To illustrate, the image alignment and AR processes may update/cycle at the same frame rate as the imaging cameras 114, 116, and 118 because these processes are directly tied to the captured imagery. However, the non-image sensor capture and current context determination may proceed at different cycle rates. To illustrate, it may be appropriate to capture gyroscopic or inertial sensor states more frequently than the frame rate in order to have sufficiently accurate inertial navigation estimation. Conversely, the location-related features of the electronic device 100 may not require a high position resolution, and thus the image analysis process to determine the current position/orientation of the electronic device 100 may occur at a cycle rate slower than the frame rate of the imaging cameras.

Figure 8:
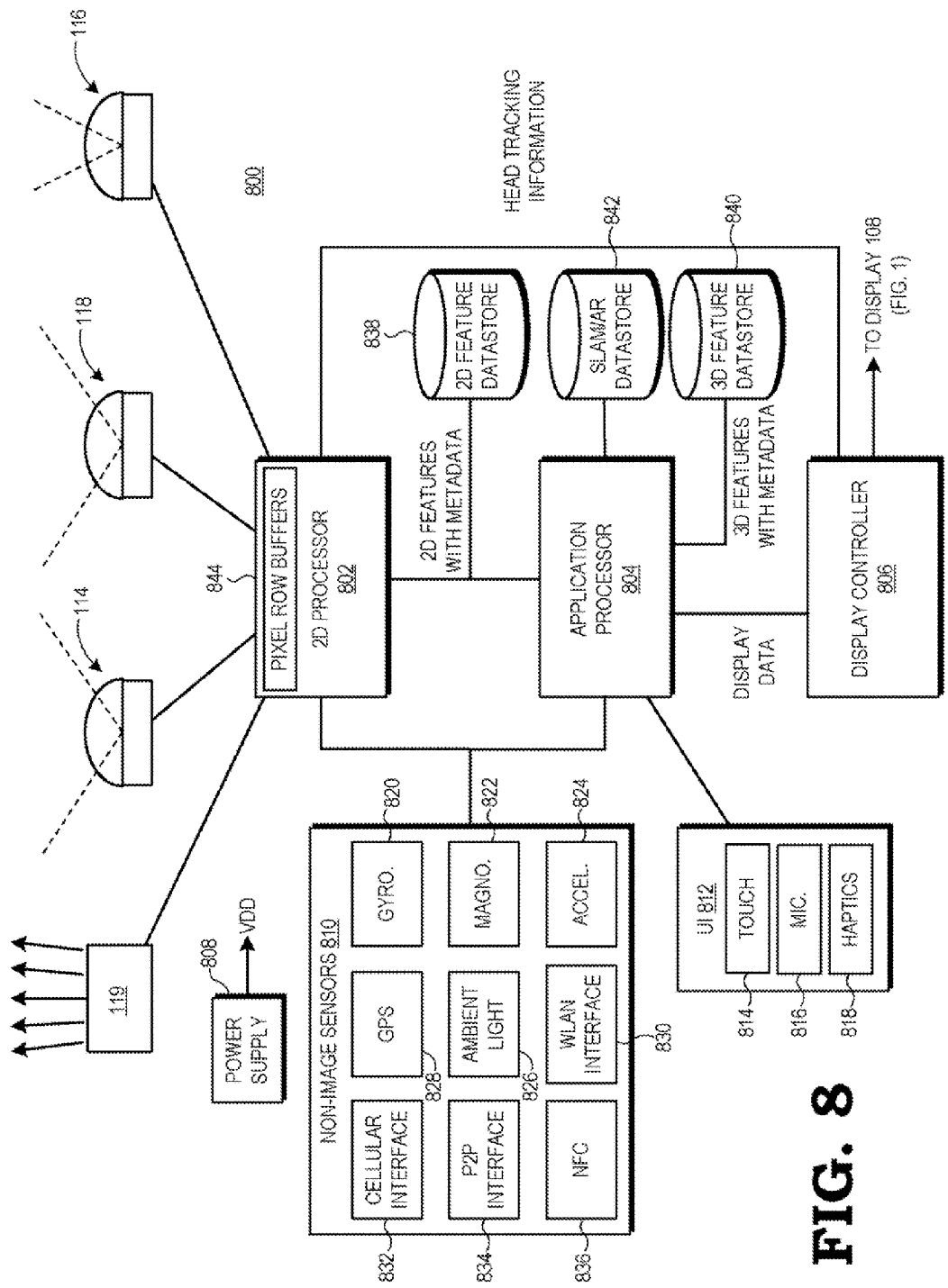
FIG. 8 is a block diagram illustrating a processing system of an electronic device for determining two-dimensional (2D) and three-dimensional (3D) spatial feature data from captured imagery of a local environment in accordance with at least one embodiment of the present disclosure.

FIG. 8 illustrates an example processing system 800 implemented by the electronic device 100 in accordance with at least one embodiment of the present disclosure. The processing system 800 includes the wide-angle imaging camera 114, the narrow-angle imaging camera 116, the user-facing imaging camera 118, and the depth sensor 120. The processing system 800 further includes a 2D processor 802, an application processor 804, a display controller 806, a power supply 808, a set 810 of non-image sensors, and a user interface 812.

In a portable user device implementation, such as a tablet computer or smartphone implementation, the power supply 808 can include a battery, solar array, or other portable power source used to power the electrical components of the electronic device. In a non-portable device implementation, the power supply 808 can include a power converter to convert an external voltage supply to a voltage level appropriate for the components of the electronic device 100. The user interface 812 includes one or more components manipulated by the user to provide user input to the electronic device 100, such as a touchscreen 814, a mouse, a keyboard, a microphone 816, various buttons or switches, and various haptic actuators 818. The set 810 of non-image sensors can include any of a variety of sensors used to provide non-image context or state of the electronic device 100. Examples of such sensors include a gyroscope 820, a magnetometer 822, an accelerometer 824, and an ambient light sensor 826. The non-image sensors further can include various wireless reception or transmission based sensors, such as a GPS receiver 828, a wireless local area network (WLAN) interface 830, a cellular interface 832, a peer-to-peer (P2P) wireless interface 834, and a near field communications (NFC) interface 836. The non-image sensors also can include user input components of the user interface 812, such as the touchscreen 814 or the microphone 816.

The electronic device 100 further has access to various datastores storing information or metadata used in conjunction with its image processing, location mapping, and location-utilization processes. These datastores can include a 2D feature datastore 838 to store metadata for 2D spatial features identified from imagery captured by the imaging cameras of the electronic device 100 and a 3D spatial feature datastore 840 to store metadata for 3D features identified from depth sensing for the 2D spatial features using multiview analysis or modulated light-based depth sensing. The metadata stored for the 2D and 3D features can include, for example, timestamps for synchronization purposes, image frame identifiers of the image frames in which the spatial features were identified, identifiers of the capture device used, calibration information, and the like. This metadata further can include non-image sensor data that was contemporaneously with the image frame containing the identified spatial feature, such as GPS, wife, or other radio information, time-of-day information, weather condition information (which affects the lighting), and the like. The datastores further can include a SLAM/AR datastore 842 that stores SLAM-based information, such as mapping information for areas of the local environment 112 (FIG. 1) already explored by the electronic device 100, or AR information, such as CAD-based representations of the relative locations of objects of interest in the local environment 112. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 800 employs two processors: the 2D processor 802 configured to efficiently identify 2D spatial features from visible-light imagery and depth sensor imagery captured by the imaging cameras of the electronic device 100; and the application processor 804 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 802 and the application processor 804 may be implemented in a single processor, or more than two processors together may implement the described functionality. The 2D processor 802 can be implemented as, for example, a single-core or multiple-core graphics processing unit (GPU) and the application processor 804 can be implemented as, for example, a GPU or a single-core or multiple-core central processing unit (CPU).

The 2D processor 802 is coupled to the wide-angle imaging camera 114, the narrow-angle imaging camera 116, and the user-facing imaging camera 118 so as to receive image data captured by the imaging cameras in one or more pixel row buffers 844. In one embodiment, the 2D processor 802 includes an interface and a pixel row buffer 844 for each imaging camera so as to be able to receive image data from each imaging camera in parallel. In another embodiment, the 2D processor 802 includes a single interface and a pixel row buffer 844 and thus the 2D processor 802 multiplexes between the imaging cameras. The pixel row buffer 844 can include storage sufficient for one or more rows of pixels (up to a full frame buffer) from the image frames captured by the corresponding imaging camera. To illustrate, one or more of the imaging cameras may include rolling shutter imaging cameras whereby the image sensor of the imaging camera is scanned one row at a time, or a subset of rows at a time. As each row or row subset is scanned, its pixel data is temporarily buffered at the pixel row buffer 844. The buffered rows of pixels then may be transferred to a larger storage area, such as a separate frame buffer (not shown) for full frame processing.

The 2D processor 802 is configured to process the captured image data from the imaging cameras to identify 2D spatial features present in the image data. In some embodiments, the 2D processor 802 implements a hardware configuration specifically designed for this task. In other embodiments, the 2D processor 802 includes a more general processor architecture that provides the 2D spatial feature detection through execution of a software program configured to implement the 2D spatial feature detection process. The 2D processor 802 also may implement a combination of specialized hardware and specialized software for this purpose. As described above, any of a variety of well-known 2D spatial feature detection or extraction algorithms may be implemented by the 2D processor 802. The 2D processor 802 stores metadata and other information pertaining to the identified 2D spatial features to the 2D feature datastore 838.

The 2D processor 802, in one embodiment, is configured to analyze imagery captured by the user-facing imaging camera 118 to track the current position/orientation of the user's head using any of a variety of well-known head tracking algorithms. In the depicted example, the 2D processor 802 provides the head tracking information to the display controller 806, which in turn is configured to adjust the displayed imagery to react to changes in the user's view perspective as reflected in changes in position/orientation of the user's head. In another embodiment, the 2D processor 802 provides the head tracking information to the application processor 804, which in turn modifies the display data to reflect updated view perspectives before the display data is provided to the display controller 806.

The 2D processor 802 also acts as a controller that operates the modulated light projector 119 in its use in determining depth data for spatial features identified in the captured imagery of the local environment 112. In certain conditions, such as relatively bright settings (as sensed using the ambient light sensor 826), the 2D processor 802 may use multiview image analysis of imagery concurrently captured by the wide-angle imaging camera 114 and the narrow-angle imaging camera 116 to determine depth data for spatial features present in the captured imagery. In other conditions, such as relatively low lighting conditions, the 2D processor 802 may switch to the use of the depth sensor 120 (FIG. 1) to determine this depth data. In other embodiments, the processing system 800 implements a controller (not shown) separate from the 2D processor 802 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging cameras. Thus, the 2D processor 802 may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 802 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 802 can capture a visible-light image, and quickly thereafter control the modulated light projector 119 to project a modulated light pattern and capture a reflected modulated light image. The 2D processor 802 then can develop a depth map for the visible-light image from the reflected modulated light image as they effectively represent the same scene with the same spatial features at the same coordinates due to the contemporaneous capture of the visible-light image and the reflected modulated light image.

While effective in aiding the sensing of relative depths of spatial features present in captured imagery, the projection of the modulated light pattern can interfere with other operations of the electronic device 100. For one, while the modulated light projector 119 can be configured to project an infrared or near-infrared light pattern, the reflection of this infrared or near-infrared light can introduce interference into the visible-light imagery captured by the imaging cameras should they happen to activate their shutters while the modulated light pattern is being projected. This interference can both detract from the user's viewing experience of the captured visible-light imagery, as well as negatively impact the accuracy or efficacy of the image processing performed by the 2D processor 802. Moreover, the activation of the modulated light projector 119 can consume a significant amount of power, which can impact the run time of the electronic device 100 between battery recharges. Various techniques implementable by the processing system 800 for reducing interference and power consumption by the modulated light projector 119 are described below with reference to FIGS. 10-12.

The application processor 804 is configured to identify 3D spatial features represented in the captured imagery using the 2D spatial features represented in the 2D feature datastore 838 and using non-image sensor information from the set 810 of non-image sensors. As with the 2D processor 802, the application processor 804 may be configured to perform this process through a specialized hardware configuration, through execution of software configured for this process, or a combination of specialized hardware and software. Metadata and other information for the identified 3D spatial features is stored in the 3D feature datastore 840. A 2D-to-3D spatial feature extraction process is described below with reference to FIG. 9.

The application processor 804 further is configured to provide SLAM, AR, VR, and other location-based functionality using 3D spatial features represented in the 3D feature datastore 840 and using the current context of the electronic device 100 as represented by non-image sensor data. The current context can include explicit or implicit user input obtained from, for example, the user interface 812 or via an analysis of user interactions. This functionality can include determining the current relative position/orientation of the electronic device 100 based on a visual odometry process that uses the 3D spatial features and various location-related non-image sensor data, such as a 6DoF reading from the gyroscope 820, a dead-reckoning history maintained using the accelerometer 824, a coarse absolute positional indicator determined using the GPS receiver 828 or determined using radio telemetry via the cellular interface 832, and the like. Similarly, the application processor 804 can use a history of positions/orientations of the electronic device 100 and a history of spatial features observed in those positions/orientations to create a map of the local environment 112.

The location-based functionality provided by the application processor 804 further can include AR-related or VR-related functionality that includes identifying and accessing from the SLAM/AR datastore 842 graphical information to be provided as a graphical overlay on the display 108 based on the current position/orientation determined by the application processor 804. This graphical overlay can be provided in association with imagery captured by the imaging cameras in the current position/orientation for display at the display 108 via the display controller 806. The display controller 806 operates to control the display 108 (FIG. 1) to display imagery represented by display data received from the application processor 804. Further, in some embodiments, the display controller 806 can receive head tracking information from the 2D processor 802 and adjust the view perspective of the imagery being displayed based on the user head position or eye position represented in the received head tracking information.

In a conventional 2D spatial feature detection application, an entire image frame is captured and then buffered at a frame buffer before a GPU or other processor initiates spatial feature extraction for the image frame. This approach can introduce a significant delay or lag in the spatial feature detection, and thus introduce a significant delay or lag in position/orientation detection, due to the delay incurred in transferring the image data to the frame buffer in preparation for its access by the GPU. To reduce or eliminate this lag, in some embodiments the 2D processor 802 is configured to perform 2D spatial feature extraction as captured image data is streamed to the 2D processor from a corresponding imaging camera. As the pixel row buffer 844 receives a subset of one or more pixel rows from the imaging camera, the 2D processor 802 processes the image portion represented by the subset of buffered pixels to identify 2D spatial features present in the image portion. The 2D processor 802 then may stream 2D spatial features to the 2D feature datastore 838, or directly to an input of the application processor 804, as they are identified from the image portion. As 2D spatial features are identified as the image data is streamed in, and as the identified 2D spatial features are streamed to the application processor 804 as they are identified, the 2D spatial feature detection process and the 3D spatial feature detection process can proceed at a faster rate compared to conventional image processing techniques that rely on whole image frame analysis.

Figure 9:
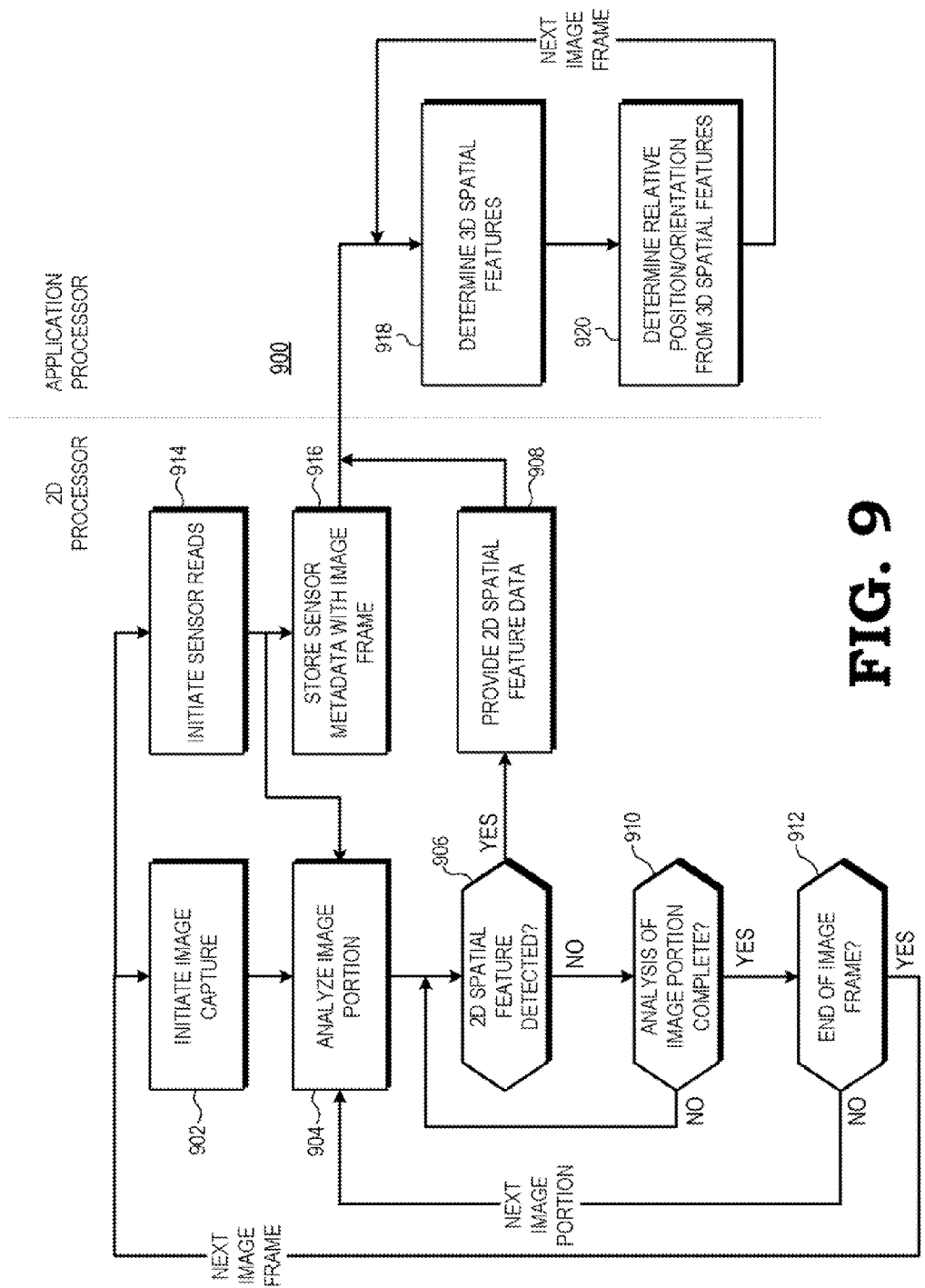
FIG. 9 is as flow diagram illustrating an operation of the processing system of FIG. 8 for 2D and 3D spatial feature extraction in accordance with at least one embodiment of the present disclosure.

FIG. 9 illustrates an example method 900 for 2D and 3D spatial feature extraction using the two-processor architecture of processing system 800 in accordance with at least one embodiment. An iteration of method 900 starts with the initiation of the capture of an image by one of the forward-facing imaging cameras 114 and 116 at block 902. At block 904, the 2D processor 802 scans a portion of the image being captured at the image sensor of the imaging camera into the pixel row buffer 844 and analyzes the image portion from the pixel row buffer 844 to identify any 2D spatial features present in the image portion. In response to detecting a 2D feature (block 906), the 2D processor 802 provides 2D spatial feature data representing the 2D feature for storage in the 2D feature database 838 at block 908. This 2D spatial feature data can include, for example, a spatial feature identifier, an indicator of the image in which the spatial feature was found or a time stamp associated with such image, an indicator of a position of the spatial feature within the image, an indicator of the type of spatial feature (e.g., edge, corner, etc.), and the like. The 2D processor 802 repeats the process of blocks 904, 906, and 908 until spatial feature extraction for the image portion is complete (block 910), at which point the method 900 returns to block 904, whereupon the next image portion is scanned from the image sensor of the imaging camera to the pixel row buffer 844 and the 2D spatial feature extraction process of blocks 904-910 repeats for this next image portion. When 2D spatial feature extraction of the last image portion of the image frame has been completed (block 912), the method 900 returns to block 902 and the process is repeated for the next image captured by an imaging camera of the electronic device 100.

Contemporaneously with the image capture and analysis process of blocks 902-912, the 2D processor 802 determines a current context of the electronic device 100 that is to be associated with the captured image. To this end, at block 914 the 2D processor 802 initiates the reading of one or more of the non-image sensors and uses the resulting non-image sensor data to specify one or more parameters of the current context of the electronic device 100. This can include, for example, specifying the 6DoF orientation of the electronic device 100 at the time the image was captured at block 902, specifying the ambient light incident on the electronic device 100 at this time, specifying a received signal strength indication (RSSI) for cellular signaling, specifying GPS coordinates of the electronic device 100 at this time, and the like. At block 916, the 2D processor 802 provides this current context information for storage in the 2D feature datastore as metadata associated with the 2D spatial features identified in the concurrently captured image frame. The current context capture process of blocks 914 and 916 then may repeat for the next image capture cycle.

As noted, in some embodiments, the 2D processor 802 streams the 2D spatial features and their associated context metadata to the application processor 804 as the 2D spatial features are identified. Accordingly, as 2D spatial feature data and metadata for a 2D spatial feature is received, at block 918 the application processor 804 converts the 2D spatial feature to a 3D spatial feature by determining the current depth of the 2D spatial feature. As noted, where two concurrently captured images are available, the depth of a spatial feature may be determined through multiview analysis of the two images. In this case, the application processor 804 correlates 2D spatial features from the two frames to identify a set of 2D spatial features that likely represent the same spatial feature and then determines the depth of the 2D spatial feature based on the parallax exhibited between the positions of the spatial feature between the two images. In instances where two concurrently captured images are not available, the application processor 804 can determine the current depth of the received 2D spatial feature based on the depth data concurrently captured by the depth sensor 120.

With the generation of the 3D spatial feature, at block 920 the application processor 804 may attempt to determine the current position/orientation of the electronic device 100 through the application of a visual odometry algorithm to this 3D spatial feature. In some instances, the 3D spatial feature, by itself, may not be sufficiently distinct so as to allow an accurate determination of the current position/orientation. Accordingly, the electronic device 100 may buffer 3D spatial feature data representing multiple contemporaneous 3D spatial features and then attempt to determine the current position/orientation from these multiple 3D spatial features.

In the approach described above, the application processor 804 may be able to identify the current position/orientation with sufficient granularity using one or a few 3D spatial features. As each 3D spatial feature can be determined shortly after the corresponding 2D spatial feature is identified, the application processor 804 can begin the process of determining the current position/orientation even before the 2D processor 802 has completed the capture and processing of the image frame from the imaging camera. This ability to rapidly determine the current position/orientation can translate to improved location-based functionality. To illustrate, as the current position/orientation can be identified quicker than a conventional approach which requires first filling the frame buffer, AR graphical overlay information may be accessed and displayed more rapidly, which can leads to less jerkiness and artifacts in the AR-enhanced imagery displayed at the electronic device 100.

Figure 10:
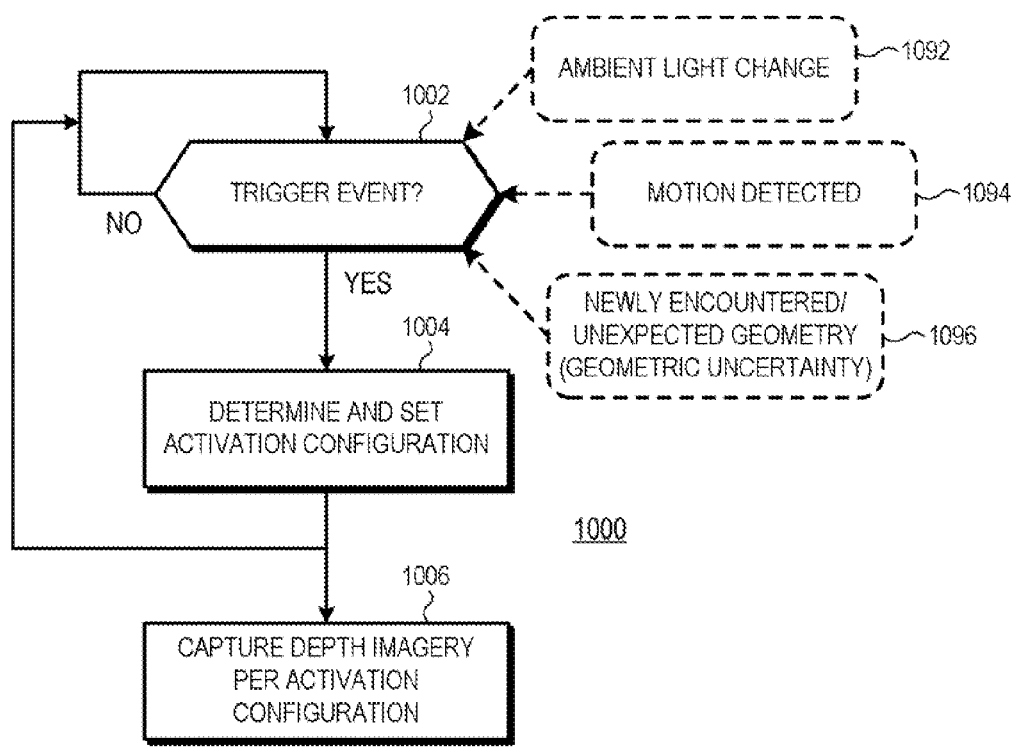
FIG. 10 is a flow diagram illustrating an operation of a modulated light-based depth sensor in accordance with at least one embodiment of the present disclosure.

FIG. 10 illustrates an example method 1000 for efficient operation of the depth sensor 120 in accordance with at least one embodiment of the present disclosure. The activation of the modulated light projector 119 of the depth sensor 120 can consume a significant amount of power. In some conventional implementations, modulated light-based depth sensors assume continuous operation and capture depth data at a frame rate of between 15-30 hertz (Hz), or a rate similar to a typical video stream. This can make the depth sensor a relatively high-powered device. In fact, the power consumed by a modulated light projector in this conventional manner can be significantly greater than the power consumed by the typical display used in a tablet, smartphone, or other portable user device.

In many instances, the amount of depth data captured in this continuous capture approach is significantly greater than the degree of depth data needed for the electronic device 100 for accurate depth analysis. Accordingly, the method 1000 illustrates a technique for selective activation of the depth sensor 120 so as to reduce or minimize the overall activation time of the depth sensor 120 while capturing sufficient depth data to permit accurate depth determinations for identified spatial features in captured imagery. In some embodiments, this selective activation can include operating the depth sensor 120 in a burst mode whereby a single or small, rapid sequence of depth images is captured on demand in response to one or more trigger event types. Under this approach, the overall power draw of the depth sensor 120 can be reduced, thereby extending the amount of time the electronic device 100 can operate for a given battery charge, while also reducing the thermal requirements of the electronic device 100.

For purposes of the following, an "activation configuration" controls operation of the depth sensor by specifying the frequency at which the modulated light projector 119 is activated to project a modulated light pattern and the intensity and duration for which the modulated light pattern is projected. This frequency, intensity, and duration together are analogous to a duty cycle. When the depth sensor 120 is disabled (e.g., when depth sensing is being performed via multiview image analysis), the activation configuration of the depth sensor 120 may be interpreted as a frequency, intensity, and duration of zero. Conversely, when the depth sensor 120 is enabled (e.g., when depth sensing to being performed via modulated light projection), the activation configuration of the depth sensor represents a non-zero frequency, intensity, and duration.

When modulated light-based depth sensing is being performed, the frequency of depth image capture generally is relative to the "familiarity" the electronic device 100 has with the immediate area that is being sensed. If the electronic device 100 has been stationary for a period of time, the electronic device 100 likely has had an opportunity to obtain sufficient depth data for the immediate area. As such, the electronic device 100 can decrease the frequency and light intensity of the depth image capture process. However, if the electronic device 100 is in motion, it is more likely that the electronic device 100 is encountering a previously-unencountered environment and thus the electronic device 100 will increase the frequency of depth image capture so as to more rapidly accumulate sufficient depth data for the local environment through which it is travelling.

In some instances, the electronic device 100 may be in an area for which it has previously developed sufficient depth data, but changes in the environment have since occurred and thus made the previous depth data unreliable. To illustrate, the electronic device 100 may have developed depth data for objects in a conference room the first time the user enters the conference room with the electronic device 100. Afterward, the furniture and fixtures in the conference room have been rearranged, so that the next time the user enters the conference room, the user is entering a previously-unencountered environment and thus the depth data for the conference room is stale. In some embodiments, the potential for change in the arrangement of objects in a given area can be addressed through an automatic periodic depth data recapture triggered by a lapse of a timer so as to refresh or update the depth data for the area. The electronic device 100 also can gauge its current familiarity with its immediate area by evaluating the geometric uncertainty present in imagery captured from the current area. This geometric uncertainty is reflected in, for example, the detection of previously-unencountered objects or geometry, such as a set of edges that were not present in previous imagery captured at the same or similar position/orientation, or the detection of an unexpected geometry, such as the shift in the spatial positioning of a set of corners from their previous positioning in an earlier-captured image from the same or similar device position/orientation.

To this end, in one embodiment the electronic device 100 catalogs the spatial features detected at a particular position/orientation. This catalog of features can include a list of spatial features, along with certain characteristics, such as their relative positions/orientations, their dimensions, etc. Because the local environment may change with respect to the same location (e.g., objects may be added or removed, or moved to new positions), when the electronic device 100 again returns to the same location, the electronic device 100 can determine whether it is in a previously-unencountered environment by identifying the spatial features currently observable from the location and comparing the identified spatial features with the spatial features previously cataloged for the location. If there is sufficient dissonance between the currently-encountered spatial features and the previously-encountered spatial features for the same location, the electronic device 100 concludes it is in a previously-unencountered environment and proceeds with configuring the activation configuration of the depth sensor 120 accordingly.

Thus, to initiate an adjustment to the activation configuration of the depth sensor 120, at block 1002 the 2D processor monitors for a trigger event selected to cause a reassessment of the current activation configuration of the depth sensor 120. This trigger event can include a change in the sensed ambient light that exceeds a threshold (block 1092), the detection of motion of the electronic device (or the detection of the absence of motion) (block 1094), or the detection of certain geometric uncertainty in the imagery currently being captured by the imaging cameras 114, 116, and/or 118 (block 1096). The trigger event also can include the lapse of a timer that represents a periodic refresh trigger.

In response to detecting a trigger event, at block 1004 the 2D processor 802 determines an appropriate revised activation configuration for the depth sensor 120 based on the trigger event. As an example, if the trigger event 1002, 1092 is that the sensed ambient light exceeded one threshold, the 2D processor 802 elects to switch from multiview-based depth sensing to modulated light-based depth sensing, and thus activates the depth sensor 120 and initially sets the frequency, intensity, and duration of projection of a modulated light pattern to specified default values. Conversely, if the trigger event 1002, 1092 is that the sensed ambient light fell below a lower threshold, the 2D processor 802 elects to switch back to multiview-based depth sensing and thus deactivates the depth sensor 120 by setting the frequency, intensity, and duration to zero. As another example, if the trigger event 1002, 1094 is that the electronic device 100 is traveling at a speed above a threshold, then the 2D processor 802 increases the frequency of modulated light pattern projections and corresponding reflected modulated light image captures. That is, the 2D processor 802 can enter a burst mode whereby a rapid sequence of depth image captures is conducted. Conversely, if the trigger event 1002, 1094 is that the electronic device 100 is traveling at a speed below a threshold, the 2D processor 802 decreases the frequency of modulated light pattern projections and corresponding reflected modulated light image captures. As a further example, the 2D processor 802 may increase or decrease the frequency of modulated light pattern projections/reflected modulated light image captures based on a comparison of an indicator of the detected geometric uncertainty to one or more thresholds (block 1096).

The current context of the electronic device 100 also may be used in determining the appropriate activation configuration. To illustrate, if the current context indicates that the user is using the electronic device 100 to provide an AR graphical overlay that is supposed to precisely identify the location of non-visible or buried objects, it may be more imperative that the electronic device 100 accurately identify the relative 3D positions of spatial features so as to accurately position the AR graphical overlay over the underlying captured image. As such, the 2D processor 802 may set the modulated light projections to the higher end of a range associated with a corresponding trigger event. However, if the current context indicates that the user is using the electronic device 100 to provide general navigational guidance via displayed directional areas, it may be less imperative to accurately identify the relative 3D positions of spatial features and thus the 2D processor 802 may set the modulated light projections to the lower end of the range associated with the corresponding trigger event.

The duration or intensity also may be revised based on the trigger event type or the current context of the electronic device 100. For example, if there is more ambient light present in the local environment, and thus more chance of interference with the modulated light pattern, the 2D processor 802 may configure the modulated light projector 119 to project the modulated light pattern at a higher intensity and for a longer duration so as to more fully energize the image sensor with the reflected modulated light pattern. As another example, the duration or intensity of the modulated light pattern also may be set based on the proximity of the electronic device 100 to an object in the field of view, or a reflectance of materials present in the field of view.

With the revised activation configuration set, at block 1006 the 2D processor 802 activates the modulated light projector 119 and captures the resulting depth images (that is, the reflected modulated light images) at a frequency specified by the activation configuration set at block 1004. In parallel, the method 1000 returns to block 1002 whereby the 2D processor 802 continues to monitor for another trigger event so as to initiate the next iteration of the depth sensor configuration process represented by method 1000.

Figure 11:
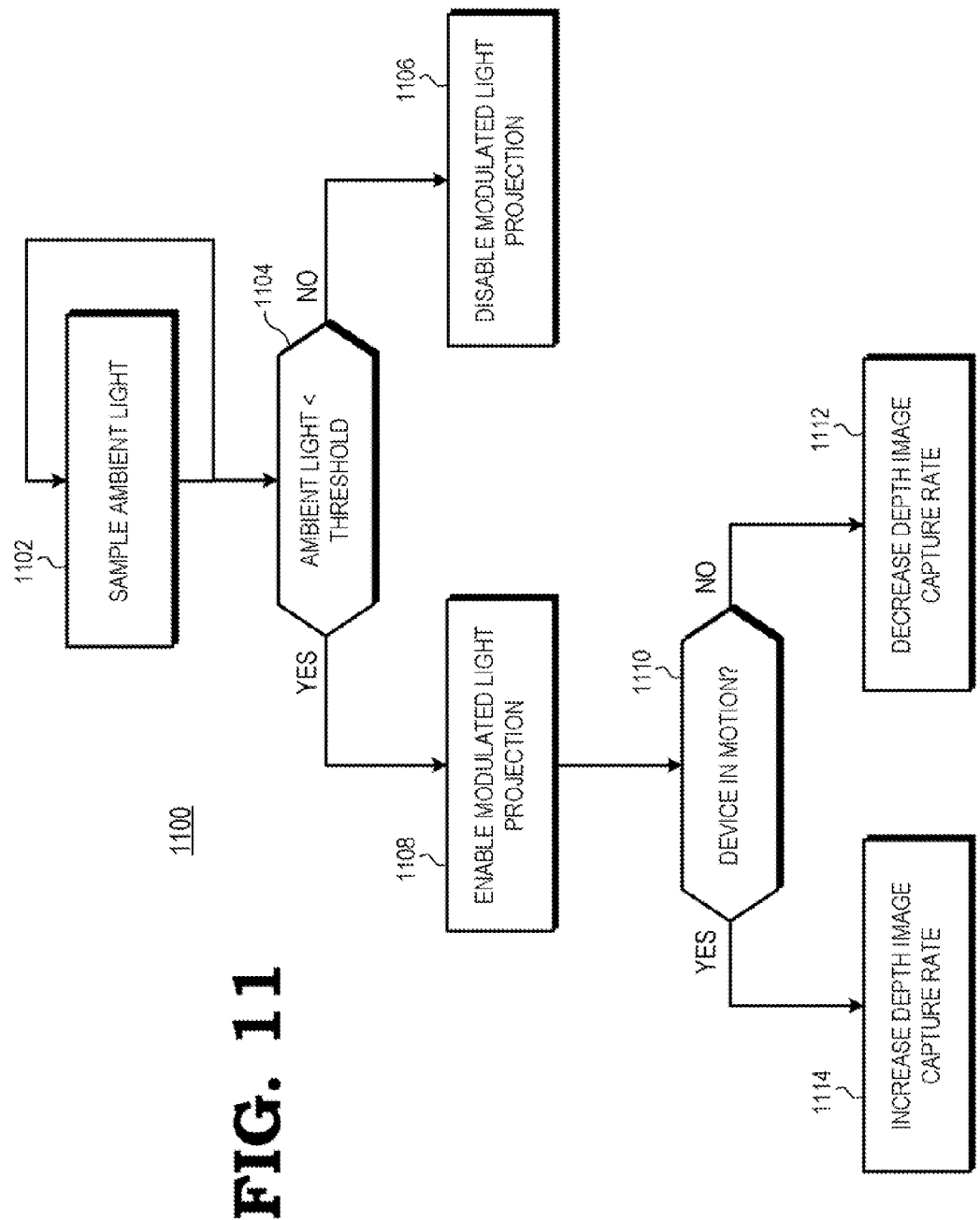
FIG. 11 is a flow diagram illustrating a method for controlling an activation configuration of a modulated light-based depth sensor in accordance with at least one embodiment of the present disclosure.

FIG. 11 illustrates a method 1100 that represents a specific example implementation of the more general method 1000 in accordance with at least one embodiment of the present disclosure. For the method 1100, the activation configuration of the depth sensor 120 is controlled based on the ambient light incident on the electronic device 100 and based on the motion of the electronic device 100. Accordingly, at block 1102 the 2D processor 802 samples the ambient light sensor 826 (FIG. 8) to obtain the current ambient light reading and at block 1104 the 2D processor 802 compares the current ambient light reading to a specified threshold. If the current ambient light reading is greater than the threshold, at block 1106 the 2D processor 802 enters a stereoscopic or other multiview depth sensing mode (or stays in the multiview depth sensing mode if already in this mode) and disables the modulated light projector 119.

If the current ambient light reading is less than the threshold, at block 1108 the 2D processor 802 enters a modulated-light depth sensing mode (or stays in this mode if it is already in this mode) and enables the modulated light projector 119. Further, if the 2D processor 802 switches to this mode from the modulated light depth sending mode, the 2D processor 802 sets the activation configuration to a default non-zero frequency, intensity, and duration. While in the modulated-light depth sensing mode, at block 1110 the 2D processor 802 monitors the accelerometer 824 to determine whether the electronic device 100 is in motion. If not in motion, at block 1112 the 2D processor 802 may decrease the depth image capture rate (and correspondingly decrease the frequency of modulated light projections) from the default rate after a specified lapse of time since motion ceased. If in motion, at block 1114 the 2D processor 802 may increase the depth image capture rate (and correspondingly increase the frequency of modulated light projections) from the default rate. Concurrently, the method 1100 returns to block 1102 whereby the 2D processor 802 captures the next ambient light reading and begins the next iteration of tuning the depth image capture rate to the current conditions encountered by the electronic device 100. Note that the sampling of the ambient light sensor 826 (block 1104) and the sampling of the accelerometer 824 (block 1110), and the processes enacted in response to the resulting sample values, may occur at the same rate or at different rates.

FIG. 12 illustrates an example method 1200 for visible-light image capture during modulated light-based depth sensing by the electronic device 100 in accordance with at least one embodiment. Image sensors, such as those that may be deployed in the imaging cameras 114, 116, and 118, are sensitive to a broad range of the electromagnetic spectrum, including both visible light and infrared light. Accordingly, the infrared or near-infrared modulated light pattern projected by the modulated light projector 119 can interfere with an imaging camera attempting to capture visible-light at the same time. Typically, this interference is manifested as the modulated light pattern being visible in the captured visible light imagery.

In many instances, it is not practicable to attempt to remove the modulated light pattern from the visible light imagery through post-capture image processing. Accordingly, the method 1200 represents a technique for removing corrupted image frames in reliance on the persistence of vision phenomenon that prevents a viewer from readily detecting the removed corrupted image frame or the use of a replacement image frame in its place. Thus, if the imaging camera is running at, for example, 30 frames per second (fps) or 60 fps, the electronic device 100 can flash the modulated light projector 119 for a single frame every second, and then skip the display or use of the visible-light image frame that was captured while the modulated light projector 119 was active. Alternatively, a replacement image frame can be inserted into the video feed in place of the corrupted image frame so as to provide a slightly smoother video transition. This replacement image can include a duplicate of the preceding or following image frame in the video frame sequence. The replacement image also could be an interpolated image frame that is interpolated between the preceding frame and the following frame. In another approach, a pixel warping technique could be applied to correlated depth imagery to synthesize the image content of the dropped image frame. In any event, the result would be a slight lowering of the effective frame rate to an acceptable rate of 29 or 59 fps, which would be an indiscernible change to most viewers most of the time.

To this end, an iteration of the method 1200 starts at block 1202, whereby the 2D processor 802 (FIG. 8) operates one of the imaging cameras 114 and 116 to capture a visible-light image frame. At block 1204, the 2D processor 802 determines whether the modulated light projector 119 was active at the time of the image capture, and thus likely corrupted the visible-light image frame. In one embodiment, the 2D processor 802 can implement a sliding time window such that if its control history shows that the activation of the modulated light projector 119 and the operation of the shutter in the imaging camera both occurred within this sliding time window, the 2D processor 802 can conclude that the captured visible-light image frame was corrupted. In another embodiment, the 2D processor 802 can perform an image analysis to detect whether some resemblance of the modulated light pattern is present in the visible-light image frame to determine whether the visible-light image frame was corrupted.

If the visible-light image frame is deemed to be uncorrupted, at block 1206 the 2D processor 802 permits the captured image frame to be included in the video stream presented to the user. Otherwise, if the visible-light image frame is deemed to be corrupted, at block 1208 the 2D processor 802 blocks the display or other use of the corrupted image frame. As noted, this can include simply skipping the corrupted frame entirely (block 1210), generating a replacement image frame by duplicating another image frame in the video stream (block 1212), or generating a replacement image frame by interpolating between two or more other image frames in the video stream or using alternative image content (block 1214), such as the depth imagery concurrently captured by another imaging camera, to synthesize the image content present in the corrupted image frame.

In accordance with one aspect, an electronic device includes a first imaging camera disposed at a first surface and having a first angle of view, a second imaging camera disposed at the first surface and having a second angle of view greater than the first angle of view, and a depth sensor disposed at the first surface. The depth sensor can include a modulated light projector to project a modulated light pattern, and at least one of the first imaging camera and the second imaging camera to capture a reflection of the modulated light pattern. The modulated light projector may include an array of one or more vertical cavity surface emitting laser (VCSEL) diodes, an array of one or more lenses overlying the array of one or more VCSEL diodes, and a diffractive optical element overlying the array of one or more lenses. The second imaging camera may include a fish eye lens, and may be configured for machine vision image capture. The second imaging camera may include a rolling shutter imaging camera and may be configured for user-initiated image capture.

The electronic device further may include a third imaging camera disposed at a second surface and having a third angle of view greater than the first angle of view. The first imaging camera may configured for user-initiated image capture, the second imaging camera may be configured for machine vision image capture, and the third imaging camera may be configured for at least one of facial recognition and head tracking. In one embodiment, the electronic device further includes a display disposed at a second surface opposite the first surface, and the electronic device may be configured to present, via the display, imagery captured via at least one of the first imaging camera and the second imaging camera.

In accordance with another aspect of the present disclosure, an electronic device may include a first imaging camera disposed at a first surface and having a first angle of view, a second imaging camera disposed at the first surface and having a second angle of view greater than the first angle of view, and a third imaging camera disposed at a second surface and having a third angle of view greater than the first angle of view. The first imaging camera may be configured for user-initiated image capture, the second imaging camera may be configured for machine vision image capture, and the third imaging camera may be configured for at least one of facial recognition and head tracking. In one embodiment, the electronic device further includes a depth sensor having a modulated light projector, disposed at the first surface, to project a modulated light pattern, and further includes an imaging camera to capture a reflection of the modulated light pattern. The imaging camera of the depth sensor can include at least one of the first imaging camera and the second imaging camera. The modulated light projector can include an array of one or more vertical cavity surface emitting laser (VCSEL) diodes, an array of one or more lenses overlying the array of one or more VCSEL diodes, and a diffractive optical element overlying the array of one or more lenses. In one embodiment, the electronic device includes a display disposed at the second surface, whereby the electronic device is configured to present, via the display, image data captured via at least one of the first imaging camera, the second imaging camera, and the third imaging camera.

In accordance with yet another aspect, a method includes capturing first image data using a first imaging camera disposed at a first surface of an electronic device, and capturing second image data using a second imaging camera disposed at the first surface of the electronic device, the second image data representing a wider field of view than the first image data. The method further includes capturing depth data using a depth sensor disposed at the first surface of the electronic device. The method also may include determining at least one spatial feature from one or more of the first image data, the second image data, and the depth data, and determining at least one of a relative position and a relative orientation of the electronic device based on the at least one spatial feature. The method also may include capturing third image data using a third imaging camera disposed at a second surface of the electronic device, the third image data representing a wider field of view than the first image data, whereby wherein determining the at least one spatial feature includes determining the at least one spatial feature further based on the third image data.

In one embodiment, the method further includes displaying an image at the electronic device based on the first image data, the second image data, and the depth data. The method also may include determining a current context of the electronic device based at least in part on the depth data, determining an augmented graphical overlay based on the current context, and wherein displaying the image further includes displaying the image with the augmented graphical overlay. The method may include capturing third image data using a third imaging camera disposed at a second surface of the electronic device, and determining a position of a user's head based on the third image data. For this, displaying the image can include displaying the image further based on the position of the user's head. In one embodiment, capturing depth data using the depth sensor includes projecting a modulated light pattern from the first surface of the electronic device, and capturing a reflection of the modulated light pattern using at least one of the first imaging camera and the second imaging camera.

In accordance with another aspect of the present disclosure, an electronic device includes a first processor to receive image data from a first imaging camera and to determine two-dimensional (2D) spatial feature data representing one or more 2D spatial features identified from the image data. The electronic device further includes a second processor, coupled to the first processor, to determine three-dimensional (3D) spatial feature data representing one or more 3D spatial features identified based on the 2D spatial feature data. The first processor can be to initiate detection of one or more 2D spatial features from a portion of an image frame prior to receiving the entire image frame. The electronic device further may include the first imaging camera, disposed at a first surface of the electronic device, and having a first field of view, and a second imaging camera, disposed at the first surface of the electronic device, and having a second field of view narrower than the first field of view. The electronic device further may include a third imaging camera, disposed at a second surface of the electronic device, and having a third field of view greater than the second field of view, whereby the first processor is to determine the 2D spatial feature data further based on one or more 2D spatial features identified from image data captured by the third imaging camera.

In at least one embodiment, the electronic device further includes a depth sensor to capture depth data, whereby the second processor can determine the 3D spatial feature data further based on the depth data. The depth sensor can include a modulated light projector, and the depth data can include image data captured by the first imaging camera and representing a reflection of a modulated light pattern projected by the modulated light projector.

In at least one embodiment, the electronic device further may include a sensor, coupled to the second processor, to provide non-image sensor data, whereby the second processor can determine the 3D spatial feature data further based on the non-image sensor data. For each image frame, the first processor is to capture at least one sensor state of the sensor and the first processor is to determine a 2D spatial feature list of 2D spatial features identified in the image frame and to send the 2D spatial feature list and a representation of the at least one sensor state to the second processor. The sensor can include at least one selected from: an accelerometer; a gyroscope; an ambient light sensor; a magnetometer; a gravity gradiometer; a wireless cellular interface; a wireless local area network interface; a wired network interface; a near field communications interface; a global positioning system interface; a microphone; and a keypad.

In accordance with another aspect, a method includes receiving, at a first processor of an electronic device, first image data captured by a first imaging camera of the electronic device, the first image data representing a first image frame, and determining, at the first processor, a first set of one or more two-dimensional (2D) spatial features from the first image data. The method further includes determining, at a second processor of the electronic device, a set of one or more three-dimensional (3D) spatial features using the first set of one or more 2D spatial features. The method also may include receiving, at the first processor, second image data captured by a second imaging camera of the electronic device, the second image data representing a second image frame, determining, at the first processor, a second set of one or more 2D spatial features from the second image data. Determining the set of one or more 3D spatial features can include determining the set of one or more 3D spatial features based on correlations between the first set of one or more 2D spatial features and the second set of one or more 2D spatial features. The method also can include aligning image data captured by the first imaging camera and image data captured by the second imaging camera to generate a combined image frame, and displaying the combined image frame at the electronic device.

In one embodiment, the method includes receiving, at the first processor, depth data captured by a depth sensor of the electronic device, and whereby determining the set of one or more 3D spatial features can include determining the set of one or more 3D spatial features further based on the depth data. The method also may include determining, at the first processor, sensor data representative of a sensor state of at least one non-imaging sensor of the electronic device concurrent with the capture of the first image data, whereby determining the set of one or more 3D spatial features includes determining the set of one or more 3D spatial features further based on the sensor data.

In accordance with another aspect of the present disclosure, a method includes receiving, at a first processor of an electronic device, a first stream of image data captured by a first imaging camera of the electronic device, the first stream of image data representing a first image frame. The method further includes determining, at the first processor, a first set of one or more two-dimensional (2D) spatial features for a portion of the first image frame, and sending first 2D spatial feature data representative of the first set of one or more 2D spatial features to a second processor of the electronic device while continuing to receive at the first processor a portion of the first stream of image data that represents a next portion of the first image frame. The method further may include determining, at the second processor, a first partial set of one or more three-dimensional (3D) spatial features based on the first 2D spatial feature data. The method also may include receiving, at the first processor, depth data captured by a depth sensor of the electronic device. Determining the first set of one or more 3D spatial features can include determining the first set of one or more 3D spatial features further based on the depth data.

The method also may include receiving sensor data representative of a sensor state of at least one non-imaging sensor of the electronic device concurrent with receiving the first stream of image data. Determining the first set of one or more 3D spatial features can include determining the first set of one or more 3D spatial features further based on the sensor data. The non-imaging sensor can include a gyroscope, and wherein determining the first set of one or more 3D spatial features can include determining the first set of one or more 3D spatial features further based on an orientation reading from the gyroscope.

In one embodiment, the first imaging camera includes a rolling shutter imaging camera having a plurality of rows of pixel sensors, receiving the first stream of image data includes receiving a row-by-row stream of image data captured by the rolling shutter imaging camera, whereby the portion of the first image frame including image data of a first set of one or more rows of the rolling shutter imaging camera, and whereby the next portion of the image frame includes image data of a second set of one or more rows of the rolling shutter imaging camera. The method also may include receiving, at the first processor, a second stream of image data captured by a second imaging camera of the electronic device, the second stream of image data representing a second image frame. The method further may include determining, at the first processor, a second set of one or more 2D spatial features for the second image frame and streaming second 2D spatial feature data representative of the second set of one or more 2D spatial features to the second processor.

In accordance with yet another aspect of the present disclosure, an electronic device includes a depth sensor including a modulated light projector to project a modulated light pattern and a first imaging camera to capture a reflection of the modulated light pattern. The electronic device further includes a controller to selectively modify at least one of a frequency, an intensity, and a duration of projections of the modulated light pattern by the modulated light projector responsive to at least one trigger event. The electronic device further may include an ambient light sensor, wherein the at least one trigger event includes a change in ambient light detected by the ambient light sensor. The controller may increase at least one of the frequency, the intensity, and the duration of the modulated light pattern projected responsive to the ambient light falling below a first threshold and to decrease at least one of the frequency, the intensity, and the duration of the modulated light pattern projected responsive to the ambient light rising above a second threshold. The at least one trigger event can include a lapse of a timer.

The at least one trigger even may include the electronic device being located in a previously-unencountered environment, wherein the controller can increase at least one of the frequency, the intensity, and the duration of projections of the modulated light pattern responsive to the electronic device being located in a previously-unencountered environment. The electronic device further may include a wireless signal receiver to identify a coarse position of the electronic device, the wireless signal receiver comprising at least one of a global positioning system receiver, a wireless cellular receiver, and a wireless local area network receiver. The controller may determine the electronic device is in a previously-unencountered environment based on the coarse position determined by the wireless signal receiver. The electronic device further may include a second imaging camera to capture an image of a local environment of the electronic device. The controller can catalog the current environment at the electronic device based on one or more spatial features determined from the image and depth data represented by the reflection of the modulated light pattern. The controller also may determine the electronic device is in a previously-unencountered environment based on the cataloged current environment.

In at least one embodiment, the electronic device further includes a second imaging camera to capture an image of a local environment of the electronic device. The controller can determine one or more spatial features based on the image of the local environment electronic device and based on depth data represented by the reflection of the modulated light pattern, and the at least one trigger event includes a determination that one or more of the spatial features is a previously-unencountered spatial feature. Further, the at least one trigger event can include detection of motion of the electronic device above a threshold, and the controller can increase at least one of the frequency, the intensity, and the duration of the modulated light pattern projected responsive to detecting the motion above the threshold.

In one embodiment, the electronic device further includes a second imaging camera to capture images of an environment of the electronic device, and the at least one trigger event includes detecting motion above a threshold from the captured images. The controller can to increase at least one of the frequency, the intensity, and the duration of the modulated light pattern projected responsive to detecting the motion above the threshold. In one embodiment, the second imaging camera is to capture images of an environment of the electronic device, and the controller is to prevent display of images that were captured by the second imaging camera concurrent with a projection of a modulated light pattern by the modulated light projector.

In accordance with another aspect of the present disclosure, a method includes projecting modulated light patterns using a modulated light projector of an electronic device, capturing reflections of the projected modulated light patterns using an imaging camera, and controlling the modulated light projector to selectively modify at least one of a frequency, an intensity, and a duration of projections of the modulated light pattern responsive to at least one trigger event. The at least one trigger event can include at least one of: a change in ambient lighting; a detection of motion above a threshold via a second imaging camera of the electronic device; and a determination that the electronic device is in a previously-unencountered environment. The method further can include capturing at least one image of an environment of the electronic device and determining at least one spatial feature based on the at least one image, wherein the at least one trigger event includes a determination that the at least one spatial feature is a previously-unencountered spatial feature. The method further can include preventing display at the electronic device of an image that was captured by an imaging camera of the electronic device while a modulated light pattern was projected by the modulated light projector.

In accordance with yet another aspect of the present disclosure, an electronic device includes a first imaging camera, a modulated light projector to project at least a modulated light pattern, and an ambient light sensor to detect an ambient light condition of the electronic device. The method further includes a controller to control at least one of a frequency, an intensity, and a duration of projections of the modulated light pattern by the modulated light projector responsive to the ambient light condition. In one embodiment, the controller is to increase at least one of the frequency, the intensity, and the duration of the modulated light pattern projected responsive to the ambient light condition being less than a first threshold and decrease at least one of the frequency, the intensity, and the duration of the modulated light pattern projected responsive to the ambient light condition being greater than a second threshold. The first threshold and the second threshold can include the same threshold. The controller can decrease at least one of the frequency, the intensity, and the duration of projections of the modulated light pattern responsive to determining the electronic device is in a previously-encountered environment.

The electronic device further can include a second imaging camera and a depth sensor including the modulated light projector and at least one of the first imaging camera and the second imaging camera. The electronic device can determine depth data for detected spatial features using image data from the first imaging camera and image data from the second imaging camera responsive to the ambient light condition being greater than a threshold. The electronic device can determine depth data for detected spatial features using reflections of the modulated light pattern captured by one of the first imaging camera or the second imaging camera responsive to the ambient light condition being less than the threshold.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An electronic device comprising:
    a depth sensor including:
        a modulated light projector to project a modulated light pattern; and
        a first imaging camera to capture at least a reflection of the modulated light pattern; and
    a controller to selectively modify at least one of a frequency, an intensity, and a duration of projections of the modulated light pattern by the modulated light projector into a local environment of the electronic device responsive to comparing the local environment to one or more environments previously encountered by the electronic device to determine whether the electronic device has previously encountered the local environment.

2. The electronic device of claim 1, further comprising:
    a wireless signal receiver to identify a coarse position of the electronic device, the wireless signal receiver comprising at least one of a global positioning system receiver, a wireless cellular receiver, and a wireless local area network receiver; and
    wherein the controller is to determine the electronic device has previously encountered the local environment based on the coarse position determined by the wireless signal receiver.

3. The electronic device of claim 1, further comprising:
    a second imaging camera to capture an image of a local environment of the electronic device;
    wherein the controller is to catalog the local environment based on one or more spatial features determined from the image and depth data represented by the reflection of the modulated light pattern; and
    wherein the controller is to determine the electronic device has previously encountered the local environment based on the cataloged local environment.

4. An electronic device comprising;
    a depth sensor including:
        a modulated light projector to project a modulated light pattern; and
        a first imaging camera to capture at least a reflection of the modulated light pattern; and
    a controller to selectively increase at least one of a frequency, an intensity, and a duration of projections of the modulated light pattern by the modulated light projector responsive to detecting motion of the electronic device that is above a specified threshold.

5. An electronic device comprising:
    a depth sensor including:
        a modulated light projector to project a modulated light pattern; and
        a first imaging camera to capture at least a reflection of the modulated light pattern;
    a second imaging camera to capture images of an environment of the electronic device; and
    a controller to increase at least one of a frequency, an intensity, and a duration of the modulated light pattern projected responsive to detecting motion of an object in the captured images that is above a specified threshold.

6. The electronic device of claim 5, wherein the controller is to prevent display of images that were captured by the first imaging camera concurrent with capturing the reflection of the modulated light pattern.

7. A method comprising: projecting modulated light patterns into a local environment using a modulated light projector of a depth sensor of an electronic device; capturing reflections of the projected modulated light patterns using an imaging camera of the depth sensor; and controlling, at the depth sensor, the modulated light projector to selectively modify at least one of a frequency, an intensity, and a duration of projections of the modulated light pattern responsive to determining whether the electronic device has previously encountered the local environment based on a comparison of the local environment with one or more environments previously encountered by the electronic device.

8. The method of claim 7, further comprising:
    preventing display at the electronic device of an image that was captured by an imaging camera of the electronic device while a modulated light pattern was projected by the modulated light projector.

9. The method of claim 7, wherein controlling the modulated light projector comprises:
    increasing at least one of the frequency, the intensity, and the duration of projections of the modulated light pattern responsive to determining the electronic device has not previously encountered the local environment; and
    refraining from modification of each of the frequency, the intensity, and the duration of projections responsive to determining the electronic device has previously encountered the local environment based on a comparison of the local environment to one or more environments previously encountered by the electronic device.

10. The method of claim 7, wherein controlling the modulated light projector comprises:
    increasing at least one of the frequency, the intensity, and the duration of projections of the modulated light pattern responsive to determining the electronic device has not previously encountered the local environment; and
    decreasing at least one of the frequency, the intensity, and the duration of projections responsive to determining the electronic device has previously encountered the local environment.

11. A method comprising: projecting modulated light patterns using a modulated light projector of a depth sensor of an electronic device; capturing reflections of the projected modulated light patterns using a first imaging camera of the depth sensor; capturing images of an environment of the electronic device using a second imaging camera; and increasing, at the depth sensor, at least one of a frequency, an intensity, and a duration of projections of the modulated light pattern responsive to detection of motion of the electronic device that is above a specified threshold.

12. The method of claim 11, further comprising:
preventing display at the electronic device of an image that was captured by an imaging camera of the electronic device while a modulated light pattern was projected by the modulated light projector.

13. The electronic device of claim 1, wherein the controller is to prevent display of images that were captured by the first imaging camera concurrent with capturing the reflection of the modulated light pattern.

14. The electronic device of claim 4, wherein the controller is to prevent display of images that were captured by the first imaging camera concurrent with capturing the reflection of the modulated light pattern.

* * * * *